(12) United States Patent
Shiro et al.

(10) Patent No.: US 10,298,883 B2
(45) Date of Patent: May 21, 2019

(54) COMMUNICATION SYSTEM, INFORMATION PROCESSING APPARATUS, COMMUNICATION APPARATUS, AND COMPUTER-READABLE MEDIUM

(71) Applicants: Hideki Shiro, Kanagawa (JP); Takashi Hasegawa, Kanagawa (JP); Takeshi Homma, Kanagawa (JP)

(72) Inventors: Hideki Shiro, Kanagawa (JP); Takashi Hasegawa, Kanagawa (JP); Takeshi Homma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/108,853

(22) Filed: Aug. 22, 2018

(65) Prior Publication Data

US 2018/0367758 A1 Dec. 20, 2018

Related U.S. Application Data

(63) Continuation of application No. PCT/JP2016/084161, filed on Nov. 17, 2016.

(30) Foreign Application Priority Data

Mar. 18, 2016 (JP) .................. 2016-056287

(51) Int. Cl.
 *H04N 7/15* (2006.01)
 *H04L 29/08* (2006.01)
 *H04L 12/725* (2013.01)

(52) U.S. Cl.
 CPC ............. *H04N 7/15* (2013.01); *H04L 45/302* (2013.01); *H04L 67/14* (2013.01); *H04L 67/327* (2013.01)

(58) Field of Classification Search
 CPC ......... H04N 7/15; H04L 67/14; H04L 67/327; H04L 45/302
 (Continued)

(56) References Cited

U.S. PATENT DOCUMENTS 8,553,063 B2 * 10/2013 Maeng .................. H04N 7/148
348/14.01
2013/0191891 A1 7/2013 Adderly et al.
(Continued)

FOREIGN PATENT DOCUMENTS

JP 2006-013684 1/2006
JP 2013-207486 10/2013
(Continued)

OTHER PUBLICATIONS

International Search Report dated Dec. 13, 2016 in PCT/JP2016/084161 filed on Nov. 17, 2016 (with English Translation).
(Continued)

*Primary Examiner* — Melur Ramakrishnaiah
(74) *Attorney, Agent, or Firm* — Oblon, McClelland, Maier & Neustadt, L.L.P.

(57) ABSTRACT

A management apparatus is configured to, when a connection request specifying, as a communication partner, a communication apparatus or an information processing apparatus has been received from a partner apparatus, transmit a connection request to a communication apparatus. The communication apparatus is configured to transmit a reception notification message to the management apparatus, when the connection request has been received. The management apparatus is configured to, when the reception notification message has been received from the communication apparatus, identify the information processing apparatus that is in cooperation with the communication apparatus that is a transmission source of the received reception
(Continued)

notification message, and transmit the reception notification message to the identified information processing apparatus. The information processing apparatus is configured to receive an approval operation for approval of reception or a denial operation for denial of reception, when the reception notification message has been received.

12 Claims, 20 Drawing Sheets

(58) Field of Classification Search
USPC .............................. 348/14.01–14.16; 709/204
See application file for complete search history.

(56) References Cited

U.S. PATENT DOCUMENTS

| | | |
|---|---|---|
| 2015/0072664 A1 | 3/2015 | Matsumura |
| 2016/0094594 A1 | 3/2016 | Imai et al. |
| 2016/0094595 A1 | 3/2016 | Shiro et al. |
| 2016/0112675 A1 | 4/2016 | Morita et al. |
| 2016/0150183 A1 | 5/2016 | Nagamine et al. |
| 2016/0248819 A1 | 8/2016 | Nagamine et al. |
| 2016/0262206 A1 | 9/2016 | Shiro et al. |
| 2016/0277462 A1 | 9/2016 | Morita et al. |
| 2016/0295163 A1 | 10/2016 | Shiro et al. |
| 2017/0006146 A1 | 1/2017 | Homma et al. |

FOREIGN PATENT DOCUMENTS

| | | |
|---|---|---|
| JP | 2013-247427 | 12/2013 |
| JP | 5810658 | 10/2015 |
| WO | 2008/053836 | 5/2008 |

OTHER PUBLICATIONS

Written Opinion dated Dec. 13, 2016 in PCT/JP2016/084161 filed on Nov. 17, 2016.

European Search Report dated Feb. 1, 2019 in European Application 16894544.2, 14 pages.

* cited by examiner

FIG.21

| TRANSMISSION REQUEST MESSAGE | {"type": "InviteRequest", "cid": "999001015501"} |
|---|---|
| APPROVAL REQUEST MESSAGE | {"type": "AcceptRequest"} |
| DENIAL REQUEST MESSAGE | {"type": "RejectRequest"} |

FIG.22

| TRANSMISSION NOTIFICATION MESSAGE | {"type": "InviteNotification", "to": "999001015501"} |
|---|---|
| RECEPTION NOTIFICATION MESSAGE | {"type": "RingingNotification", "from": "999001015501"} |
| APPROVAL NOTIFICATION MESSAGE | {"type": "AcceptNotification"} |
| DENIAL NOTIFICATION MESSAGE | {"type": "RejectNotification"} |
| ERROR NOTIFICATION MESSAGE | {"type": "Error", "code", "400"} |

COMMUNICATION SYSTEM, INFORMATION PROCESSING APPARATUS, COMMUNICATION APPARATUS, AND COMPUTER-READABLE MEDIUM

CROSS-REFERENCE TO RELATED APPLICATIONS

The present application is a continuation application of International Application No. PCT/JP2016/084161, filed Nov. 17, 2016, which claims priority to Japanese Patent Application No. 2016-056287, filed Mar. 18, 2016. The contents of these applications are incorporated herein by reference in their entirety.

BACKGROUND OF THE INVENTION

1. Field of the Invention

The present invention relates to a communication system, an information processing apparatus, a communication apparatus, and a computer-readable medium.

2. Description of the Related Art

Due to the development of network environments, remote communication, such as television conferences, has been widely used. As a device for carrying out such remote communication, there is a dedicated communication apparatus specialized for functions of television conferences. This dedicated communication apparatus includes high performance camera and microphone, and is able to provide high quality voice and image in a television conference.

Further, remote communication may be carried out by use of a general purpose information processing apparatus, such as a smartphone, a tablet, or a notebook-type computer, instead of such a dedicated communication apparatus. Such a general purpose information processing apparatus has excellent operability, and enables easy operation in the preparatory stage of a television conference. Further, when a general purpose information processing apparatus is used, participation in a television conference or the like is possible by use of a user's account. Therefore, when a general purpose information processing apparatus is used, exchange or the like with a partner apparatus in the preparatory stage of a television conference is able to be performed by use of an address book or the like personally managed by a user of the general purpose information processing apparatus.

A system that enables easy setting of operations related to various functions of plural portable electronic devices is described in Japanese Patent No. 5810658.

Sometimes a user is not familiar with operation of a dedicated communication apparatus. In this case, the user's operation or the like in the preparatory stage of a television conference takes time. Further, the dedicated communication apparatus is usually managed by a company, an organization, or the like. Therefore, if a user accesses a connection destination registered in an address book personally managed by the user by using a dedicated communication apparatus, the user needs to manually input an account or the like of the connection destination to the dedicated communication apparatus.

SUMMARY OF THE INVENTION

According to one aspect of the present invention, a communication system includes a communication apparatus, a partner apparatus, an information processing apparatus, and a management apparatus. A communication path from the communication apparatus via a network is configured to be established to the partner apparatus. An information processing apparatus is configured to operate in cooperation with the communication apparatus. The management apparatus is configured to manage the communication path between the communication apparatus and the partner apparatus, and cooperation between the communication apparatus and the information processing apparatus. The information processing apparatus includes a first operation control unit and a first message processing unit. The first operation control unit is configured to receive a transmission operation for a connection request to the partner apparatus. The first message processing unit is configured to transmit, to the management apparatus, a transmission request message including identification information indicating the partner apparatus, when the transmission operation has been received. The management apparatus includes a message intermediary unit. The message intermediary unit is configured to identify the communication apparatus that is in cooperation with the information processing apparatus that is a transmission source of the transmission request message, and transmit the transmission request message to the identified communication apparatus, when the transmission request message has been received from the information processing apparatus. The communication device includes a second message processing unit and a call control unit. The second message processing unit is configured to receive the transmission request message from the management apparatus. The call control unit is configured to transmit the connection request to the management apparatus, when the transmission request message has been received, the connection request specifying, as a communication partner, the partner apparatus indicated by the identification information included in the transmission request message. The management apparatus further includes a call intermediary unit. The call intermediary unit is configured to transmit the connection request to the partner apparatus, when the connection request has been received from the communication apparatus, the connection request specifying the partner apparatus as the communication partner, and transmit, to the communication apparatus that is a transmission source of the connection request, an approval response to the connection request, when the approval response has been received from the partner apparatus. The communication device further includes a connection formation. The connection formation unit is configured to establish a communication path to the partner apparatus, when the approval response has been received. The call intermediary unit in the management apparatus is configured to, when the connection request specifying, as a communication partner, the communication apparatus or the information processing apparatus has been received from the partner apparatus, transmit the connection request to the communication apparatus. The call control unit in the communication apparatus is configured to receive the connection request. The second message processing unit in the communication apparatus is configured to transmit a reception notification message to the management apparatus, when the connection request has been received. The message intermediary unit in the management apparatus is configured to, when the reception notification message has been received from the communication apparatus, identify the information processing apparatus that is in cooperation with the communication apparatus that is a transmission source of the received reception notification message, and transmit the reception notification message to the identified information processing apparatus. The first operation control unit in the information processing apparatus is configured to receive an approval operation for approval of reception or a denial operation for denial of reception, when the reception notification message has been received.

BRIEF DESCRIPTION OF THE DRAWINGS

FIG. 21 is a diagram illustrating a description example of request messages; and FIG. 22 is a diagram illustrating a description example of notification messages.

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
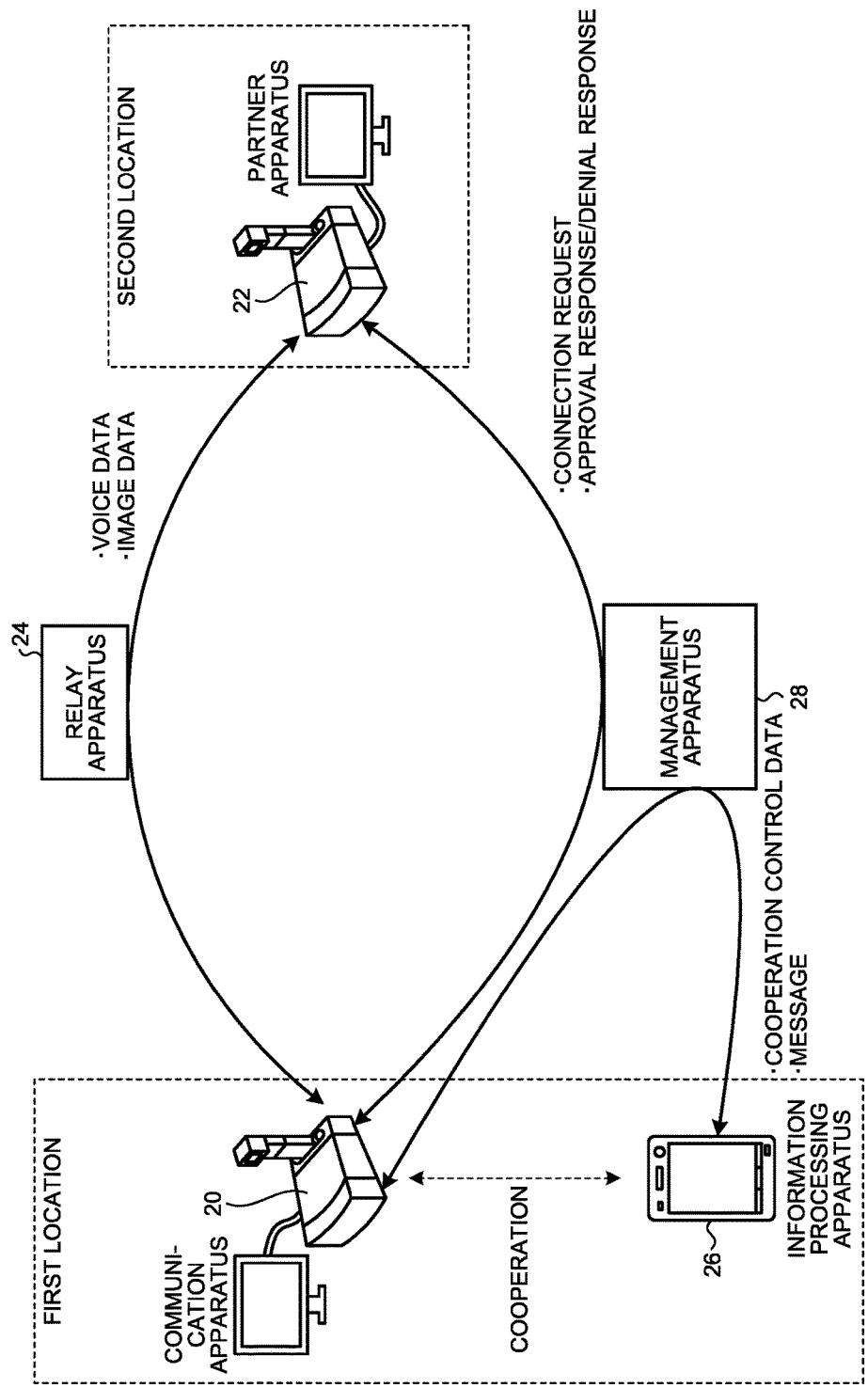
FIG. 1 is a diagram illustrating a communication system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment has an object to provide provide a communication system that is able to be operated by an information processing apparatus that is different from a communication apparatus, when a communication path is established between the communication apparatus and a partner apparatus; the information processing apparatus, the communication apparatus; and a a computer-readable medium.

Hereinafter, a communication system 10 according to an embodiment will be described.

FIG. 1 is a diagram illustrating the communication system 10 according to the embodiment. The communication system 10 lets users at different locations to communicate with each another. Specifically, the communication system 10 lets a user at a first location and a user at a second location to communicate with each other by forming a connection between a communication apparatus 20 located at the first location and a partner apparatus 22 located at the second location.

The connection herein refers to a communication path for transmission and reception of voice data, image data, and the like between apparatuses remotely separated from each other (herein, the communication apparatus 20 and the partner apparatus 22). In the communication system 10 according to the embodiment, the connection between the communication apparatus 20 and the partner apparatus 22 is formed via a relay apparatus 24. Further, in the communication system 10 according to this embodiment, one of the apparatuses transmits, to the other one of the apparatuses, a connection request (originates a call), and the other one of the apparatuses receives the connection request (receives the call). In the communication system 10 according to this embodiment, by the other one of the apparatuses transmitting, to the one of the apparatuses, an approval response to the connection request received by the other one of the apparatuses, the connection between the one of the apparatuses and the other one of the apparatuses is able to be formed. Further, in the communication system 10 according to this embodiment, if a denial response to the connection request received by the other one of the apparatuses is transmitted to the one of the apparatuses, the connection between the one of the apparatuses and the other one of the apparatuses is not formed.

The communication system 10 includes the communication apparatus 20, the partner apparatus 22, the relay apparatus 24, an information processing apparatus 26, and a management apparatus 28. These apparatuses are connected to one another via a network. The network may be a local area network (LAN); may be a wide area network (WAN), which may include a public line; and may be any network.

The communication apparatus 20 is an apparatus installed at the first location. For example, the communication apparatus 20 is a dedicated conference terminal apparatus specialized for television conferences.

The communication apparatus 20 generates: voice data obtained by collection of voice of a user at the first location; and image data obtained by imaging of the user at the first location. The communication apparatus 20 transmits the generated voice data and image data to the relay apparatus 24 via the network. Further, the communication apparatus 20 receives voice data and image data generated by the partner apparatus 22, from the relay apparatus 24. The communication apparatus 20 outputs the received voice data, and displays thereon the received image data.

The partner apparatus 22 is an apparatus installed at the second location. The partner apparatus 22 is, for example, an apparatus that enables a television conference to be performed. In FIG. 1, the partner apparatus 22 is illustrated as a dedicated conference terminal apparatus, but not being limited to thereto, the partner apparatus 22 may be a general purpose information device, such as a smartphone, a tablet, or a notebook-type computer.

The partner apparatus 22 generates: voice data obtained by collection of voice of a user at the second location; and image data obtained by imaging of the user at the second location. The partner apparatus 22 transmits, to the relay apparatus 24, the generated voice data and image data, via the network. Further, the partner apparatus 22 receives the voice data and the image data generated by the communication apparatus 20, from the relay apparatus 24. The partner apparatus 22 outputs the received voice data, and displays thereon the received image data.

The relay apparatus 24 acts as an intermediary for transmission and reception of information (voice data, image data, and the like) between devices having a connection formed therebetween. When a connection has been formed between the communication apparatus 20 and the partner apparatus 22, the relay apparatus 24 transmits the voice data and the image data received from the communication apparatus 20, to the partner apparatus 22. Further, when a connection has been formed between the communication apparatus 20 and the partner apparatus 22, the relay apparatus 24 transmits the voice data and the image data received from the partner apparatus 22, to the communication apparatus 20.

The information processing apparatus 26 is an apparatus used by the user at the first location. The information processing apparatus 26 is, for example, a smartphone, a table, or a notebook-type computer. The information processing apparatus 26 has a function of communicating with the management apparatus 28, via the network.

The information processing apparatus 26 operates in cooperation with the communication apparatus 20. The information processing apparatus 26 provides a user interface for operation of the communication apparatus 20 in cooperation therewith. For example, the information processing apparatus 26 provides a user interface for a transmission operation for a connection request to the partner apparatus 22, and a user interface for a reception operation for a connection request from the partner apparatus 22.

The management apparatus 28 manages connection for transmission and reception of information between the communication apparatus 20 and the partner apparatus 22. Specifically, the management apparatus 28 executes call control for establishing a connection. For example, the management apparatus 28 acts as an intermediary for a connection request from the communication apparatus 20 to the partner apparatus 22, and acts as an intermediary for an approval response or a denial response from the partner apparatus 22 to the communication apparatus 20. Further, for example, the management apparatus 28 acts as an intermediary for a connection request from the partner apparatus 22 to the communication apparatus 20, and acts as an intermediary for an approval response or a denial response from the communication apparatus 20 to the partner apparatus 22.

When a connection request has been transferred from one to the other one of the communication apparatus 20 and the partner apparatus 22, and an approval response has been transferred from the other to the one of the communication apparatus 20 and the partner apparatus 22, a connection is formed between the communication apparatus 20 and the partner apparatus 22. When the connection has been formed via the management apparatus 28, the relay apparatus 24 relays transmission and reception of information between the communication apparatus 20 and the partner apparatus 22.

Further, the management apparatus 28 manages the cooperation between the communication apparatus 20 and the information processing apparatus 26. Further, to enable a transmission operation and a reception operation for a connection request through the information processing apparatus 26 at the time of establishing a connection, the management apparatus 28 acts as an intermediary for data and messages for cooperation control between the communication apparatus 20 and the information processing apparatus 26.

Figure 2:
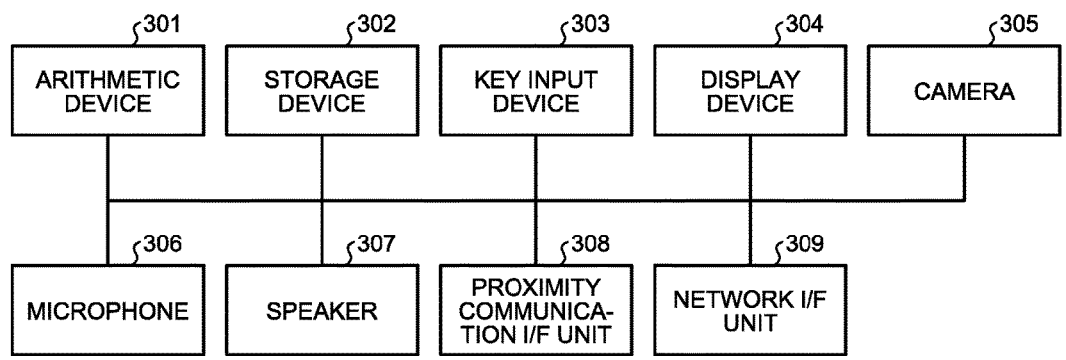
FIG. 2 is a diagram illustrating an example of a hardware configuration of a communication apparatus.

FIG. 2 is a diagram illustrating an example of a hardware configuration of the communication apparatus 20. The communication apparatus 20 includes an arithmetic device 301, a storage device 302, a key input device 303, a display device 304, a camera 305, a microphone 306, a speaker 307, a proximity communication I/F unit 308, and a network I/F unit 309.

The arithmetic device 301 includes a central processing unit (CPU), a read only memory (ROM)), a random access memory (RAM), and the like, and controls the whole communication apparatus 20 by executing a program. The storage device 302 is, for example, a flash memory and a hard disk, and stores therein the program and various data. The key input device 303 is various buttons and the like, and acquires information on operation of the communication apparatus 20 by a user.

The display device 304 displays thereon image data. The camera 305 performs imaging of a subject and generates image data. The microphone 306 collects voice of surroundings thereof and generates voice data. The speaker 307 externally outputs voice according to the voice data.

The proximity communication I/F unit 308 communicates information with an external apparatus by, for example, the Near Field Communication (NFC) method. The network I/F unit 309 transmits and receives information, to and from another apparatus via the network, according to a communication protocol, such as, for example, an Internet protocol.

Figure 3:
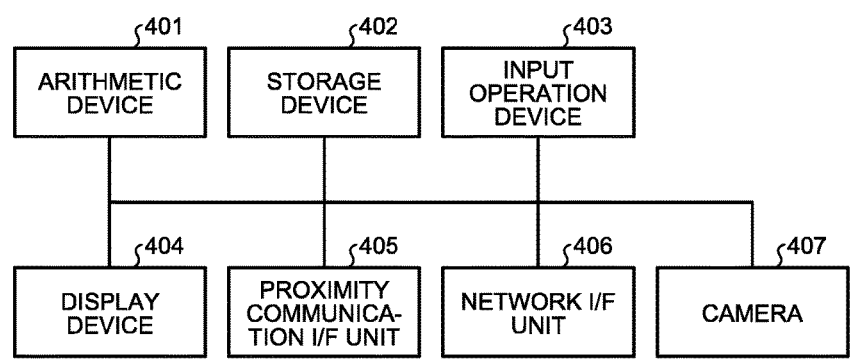
FIG. 3 is a diagram illustrating an example of a hardware configuration of an information processing apparatus.

FIG. 3 is a diagram illustrating an example of a hardware configuration of the information processing apparatus 26. The information processing apparatus 26 includes an arithmetic device 401, a storage device 402, an input operation device 403, a display device 404, a proximity communication I/F unit 405, a network I/F unit 406, and a camera 407.

The arithmetic device 401 includes a CPU, a ROM, a RAM, and the like; and controls information processing and the whole information processing apparatus 26, by executing a program. The storage device 402 is, for example, a flash memory and a hard disk, and stores therein the program and various data. The input operation device 403 is, for example, a touch panel, and acquires information input by a user. The display device 404 displays thereon various information.

The proximity communication I/F unit 405 communicates information with an external apparatus by, for example, the Near Field Communication (NFC) method. The network I/F unit 406 transmits and receives information, to and from another apparatus via the network, according to a communication protocol, such as, for example, an Internet protocol. The camera 407 performs imaging of a subject and generates image data.

As described above, the information processing apparatus 26 has a configuration similar to that of a general computer. Although the relay apparatus 24 and the management apparatus 28 are each different from the information processing apparatus 26 in that the relay apparatus 24 and the management apparatus 28 each do not include the proximity communication I/F unit 405 and the camera 407, but since the rest of their configurations is similar to that of the information processing apparatus 26, description thereof will be omitted.

Figure 4:
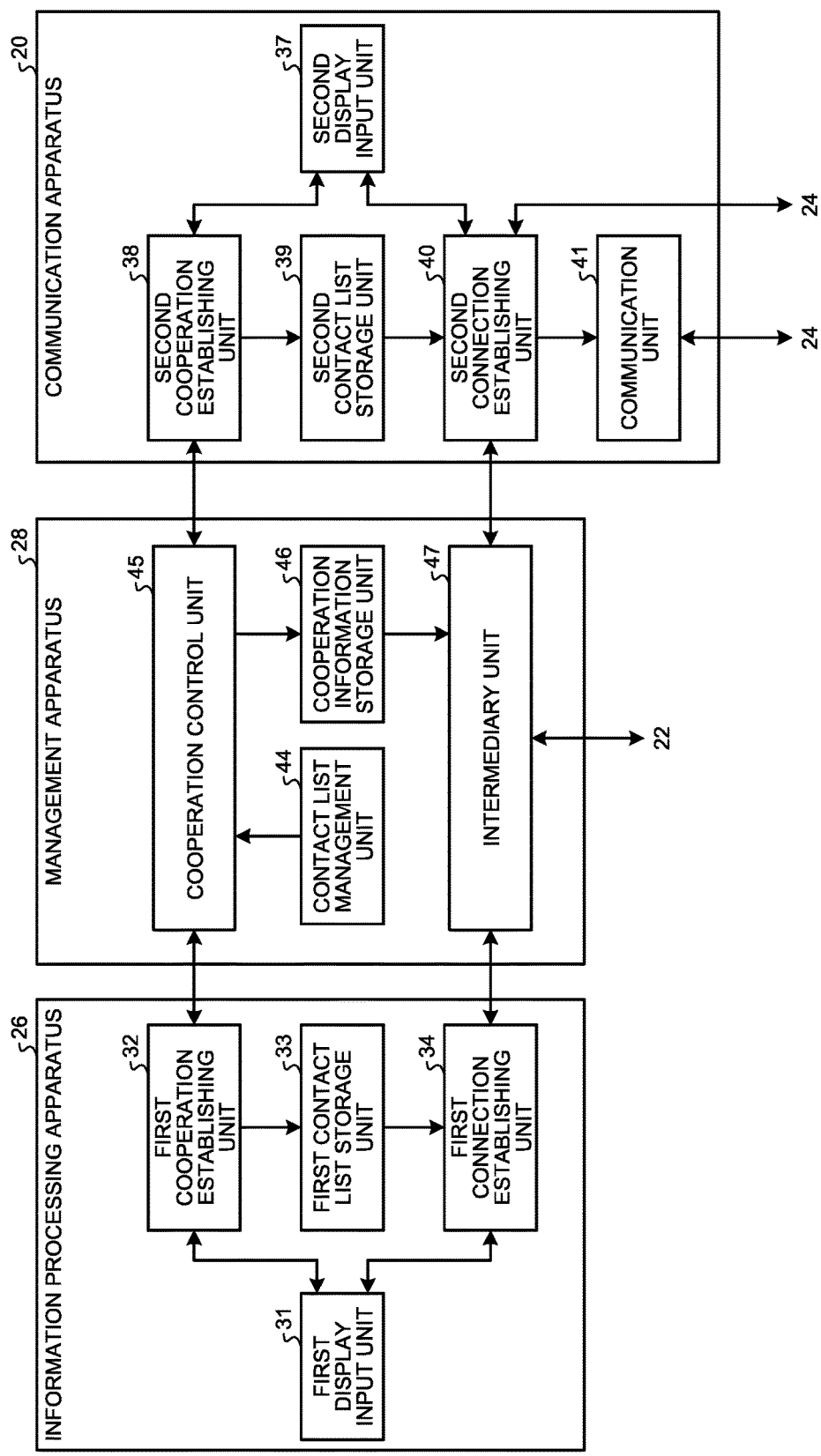
FIG. 4 is a diagram illustrating a functional configuration of the communication apparatus, the information processing apparatus, and a management apparatus.

FIG. 4 is a diagram illustrating a functional configuration of the communication apparatus 20, the information processing apparatus 26, and the management apparatus 28. The information processing apparatus 26 includes a first display input unit 31, a first cooperation establishing unit 32, a first contact list storage unit 33, and a first connection establishing unit 34. These functional blocks that the information processing apparatus 26 includes are realized by the arithmetic device 401 illustrated in FIG. 3 executing a program on a web browser executed by the arithmetic device 401, the program having been downloaded from the management apparatus 28 by the web browser. These functional blocks that the information processing apparatus 26 includes may be realized by a program being executed by the arithmetic device 401, the program having been installed in the storage device 402.

The first display input unit 31 acquires information input by a user, and displays information to the user, by controlling the input operation device 403 and the display device 404.

The first cooperation establishing unit 32 executes log-in to the management apparatus 28, establishment of the cooperation with the communication apparatus 20, and acquisition of a contact list, by performing exchange with the management apparatus 28 via the network. Detailed configuration and functions of the first cooperation establishing unit 32 will be described further with respect to FIG. 6 and FIG. 7.

The first contact list storage unit 33 stores therein the contact list acquired by the first cooperation establishing unit 32. The contact list includes identification information of other apparatuses, to which the information processing apparatus 26 is able to form connection. By the first contact list storage unit 33 storing therein the contact list, the information processing apparatus 26 is able to transmit a connection request for formation of a connection, to any one of the apparatuses listed in the contact list.

The first connection establishing unit 34 executes processing for establishing a connection between the partner apparatus 22 and the communication apparatus 20 that is in cooperation with the information processing apparatus 26. For example, the first connection establishing unit 34 executes transmission processing for a connection request to the partner apparatus 22, and reception processing for a connection request from the partner apparatus 22. Detailed configuration and functions of the first connection establishing unit 34 will be described further with respect to the drawings from FIG. 8.

The communication apparatus 20 includes a second display input unit 37, a second cooperation establishing unit 38, a second contact list storage unit 39, a second connection establishing unit 40, and a communication unit 41. These functional blocks that the communication apparatus 20 includes are realized by a program being executed by the arithmetic device 301, the program having been installed in the storage device 302 illustrated in FIG. 2.

The second display input unit 37 acquires information input by a user, and displays information to the user, by controlling the key input device 303 and the display device 304.

The second cooperation establishing unit 38 executes log-in to the management apparatus 28, establishment of the cooperation with the information processing apparatus 26, and acquisition of a contact list; by performing exchange with the management apparatus 28 via the network. Detailed configuration and functions of the second cooperation establishing unit 38 will be described further with respect to FIG. 6 and FIG. 7.

The second contact list storage unit 39 stores therein the contact list acquired by the second cooperation establishing unit 38. The second contact list storage unit 39 stores therein the same contact list as the first contact list storage unit 33. By the second contact list storage unit 39 storing therein the contact list, the communication apparatus 20 is able to transmit a connection request for formation of a connection, to any one of the apparatuses listed in the contact list.

The second connection establishing unit 40 executes processing for establishing a connection between the communication apparatus 20 and the partner apparatus 22. For example, the second connection establishing unit 40 executes reception processing for a connection request from the information processing apparatus 26, and transmission processing for a connection request to the information processing apparatus 26. Detailed functions of the second connection establishing unit 40 will be described further with respect to the drawings from FIG. 8.

The communication unit 41 executes processing for transmitting and receiving voice data and image data to and from the partner apparatus 22, via the relay apparatus 24. More detailed functions of the communication unit 41 will be described further with respect to FIG. 5.

The management apparatus 28 includes a contact list management unit 44, a cooperation control unit 45, a cooperation information storage unit 46, and an intermediary unit 47. These functional blocks that the management apparatus 28 includes are realized by a program being executed by the arithmetic device 401, the program having been installed in the storage device 402 illustrated in FIG. 3.

The contact list management unit 44 manages the contact list to be provided to the information processing apparatus 26 and the communication apparatus 20.

The cooperation control unit 45 executes authentication of log-in from the information processing apparatus 26 and the communication apparatus 20, establishment of the cooperation between the information processing apparatus 26 and the communication apparatus 20, and transmission of the contact list to the information processing apparatus 26 and the communication apparatus 20; by executing exchange with the information processing apparatus 26 and the communication apparatus 20, via the network. Detailed configuration and functions of the cooperation control unit 45 will be described further with respect to FIG. 6 and FIG. 7.

The cooperation information storage unit 46 stores therein cooperation information indicating that the information processing apparatus 26 and the communication apparatus 20 are in cooperation with each other.

The intermediary unit 47 executes processing for establishing a connection between the communication apparatus 20 and the partner apparatus 22. For example, the intermediary unit 47 executes transmission processing for a connection request to the partner apparatus 22 and reception processing for a connection request from the partner apparatus 22, by acting as an intermediary for exchange of information between the information processing apparatus 26 and the communication apparatus 20. Detailed functions of the intermediary unit 47 will be described further with respect to the drawings from FIG. 8.

Figure 5:
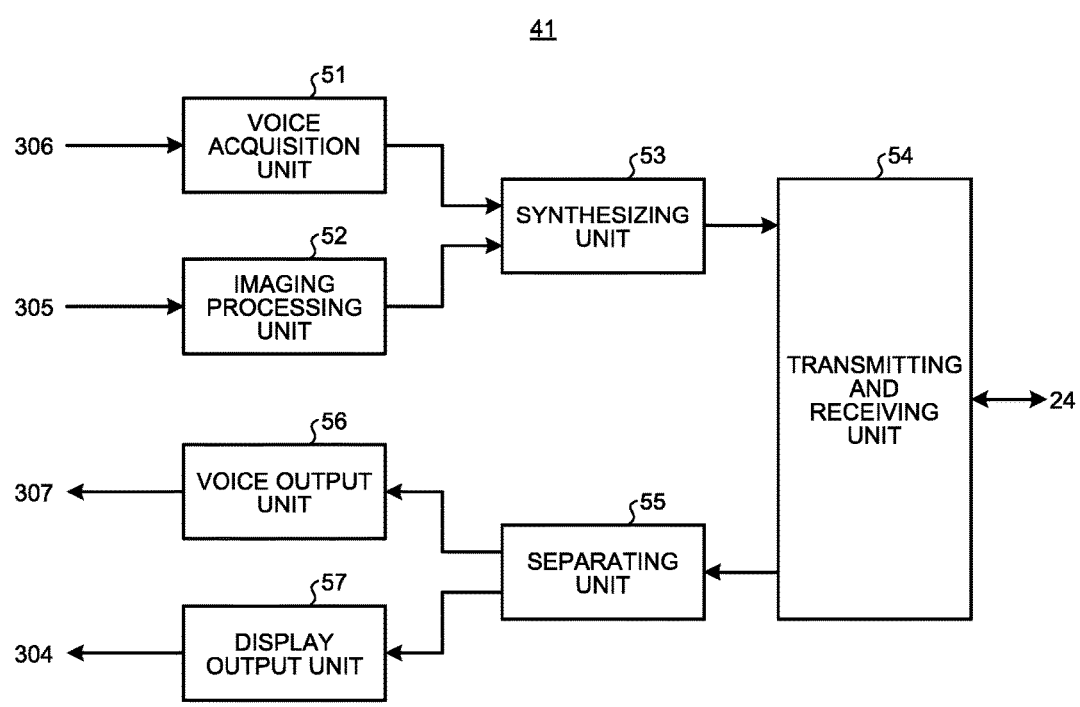
FIG. 5 is a diagram illustrating a functional configuration of a communication unit.

FIG. 5 is a diagram illustrating a functional configuration of the communication unit 41. The communication unit 41 includes a voice acquisition unit 51, an imaging processing unit 52, a synthesizing unit 53, a transmitting and receiving unit 54, a separating unit 55, a voice output unit 56, and a display output unit 57.

The voice acquisition unit 51 generates voice data from a voice signal acquired by the microphone 306. The imaging processing unit 52 generates, based on imaging data captured by the camera 305, image data. The synthesizing unit 53 synthesizes and converts the voice data and the image data into transmission data.

The transmitting and receiving unit 54 transmits the transmission data generated by the synthesizing unit 53, to the relay apparatus 24, for the transmission data to be given to the partner apparatus 22. Further, the transmitting and receiving unit 54 receives, from the relay apparatus 24, transmission data generated by the partner apparatus 22.

The separating unit 55 extracts voice data and image data from the transmission data generated by the partner apparatus 22. The voice output unit 56 causes the speaker 307 to output voice, by converting the voice data extracted by the separating unit 55 into a voice signal and giving the voice signal to the speaker 307. The display output unit 57 causes the display device 304 to display thereon an image, by controlling the display device 304 according to the image data extracted by the separating unit 55. The communication unit 41 is able to provide, to a user, communication with a remote location.

Figure 6:
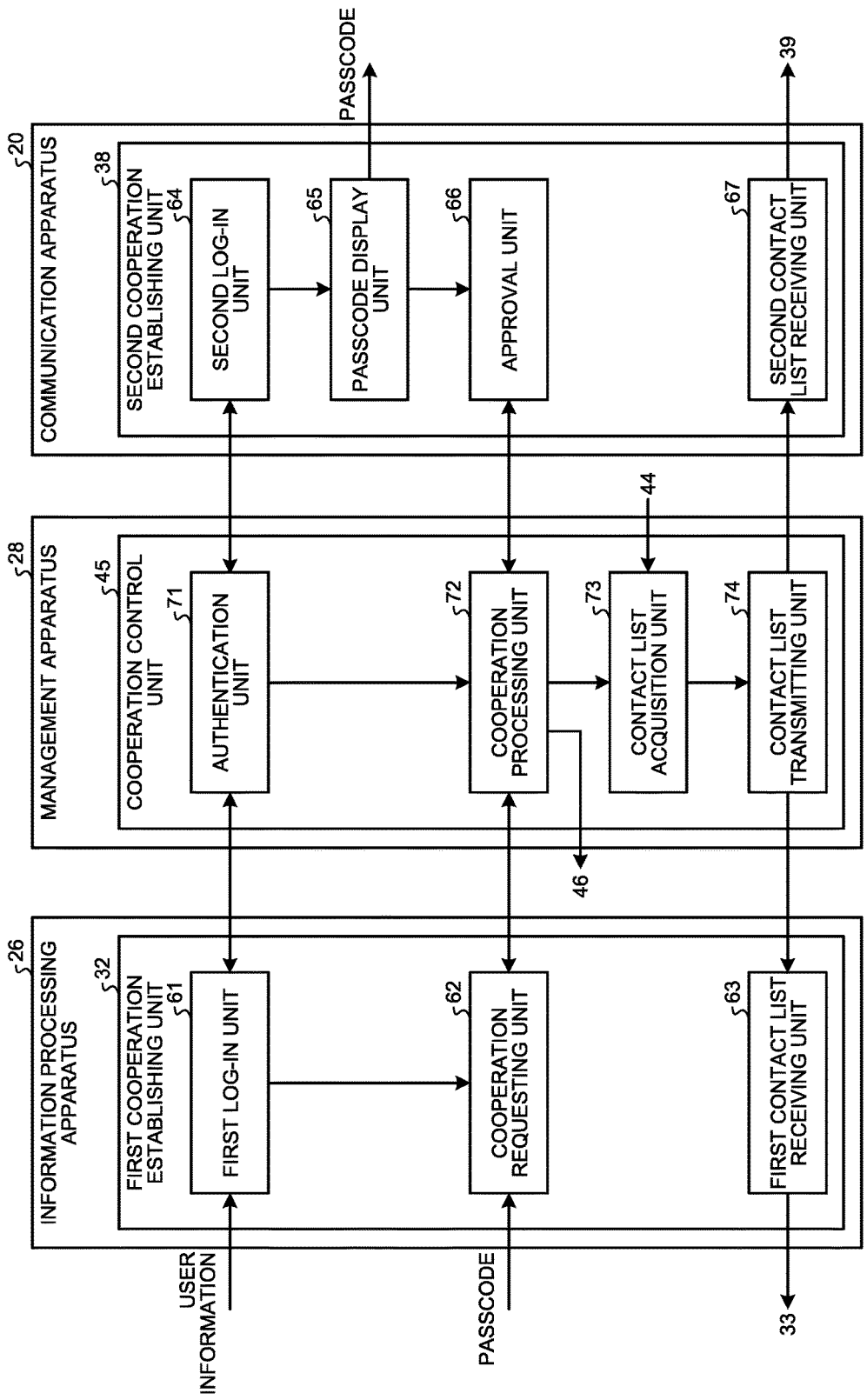
FIG. 6 is a diagram illustrating a functional configuration of a first cooperation establishing unit, a second cooperation establishing unit, and a cooperation control unit.

FIG. 6 is a diagram illustrating a functional configuration of the first cooperation establishing unit 32, the second cooperation establishing unit 38, and the cooperation control unit 45. The first cooperation establishing unit 32 in the information processing apparatus 26 includes a first log-in unit 61, a cooperation requesting unit 62, and a first contact list receiving unit 63.

The first log-in unit 61 receives, from a user, input of user information (for example, a log-in ID and a password). The first log-in unit 61 transmits, to the management apparatus 28, a log-in request including the user information input by the user. The cooperation requesting unit 62 receives input of a passcode from a user, and transmits, to the management apparatus 28, a cooperation request including the input passcode. The first contact list receiving unit 63 receives, from the management apparatus 28, the contact list, and registers, in the first contact list storage unit 33, the received contact list.

The second cooperation establishing unit 38 in the communication apparatus 20 includes a second log-in unit 64, a passcode display unit 65, an approval unit 66, and a second contact list receiving unit 67.

The second log-in unit 64 transmits, to the management apparatus 28, a log-in request including unique apparatus information that has been set beforehand for the communication apparatus 20. The passcode display unit 65 displays a passcode to the user. The approval unit 66 receives, from the management apparatus 28, the cooperation request, and determines whether or not the passcode included in the received cooperation request and the passcode displayed by the passcode display unit 65 agree with each other. If the passcode included in the received cooperation request and the passcode displayed by the passcode display unit 65 agree with each other, the approval unit 66 transmits, to the management apparatus 28, approval information indicating that the cooperation is approved. The second contact list receiving unit 67 receives, from the management apparatus 28, the contact list, and registers, in the second contact list storage unit 39, the received contact list.

The cooperation control unit 45 in the management apparatus 28 includes an authentication unit 71, a cooperation processing unit 72, a contact list acquisition unit 73, and a contact list transmitting unit 74.

The authentication unit 71 receives the log-in request, from the information processing apparatus 26, and checks whether or not the user information included in the received log-in request is valid. If the user information is valid, the authentication unit 71 accepts log-in from the information processing apparatus 26 and permits connection to the information processing apparatus 26. Further, the authentication unit 71 receives the log-in request, from the communication apparatus 20, and checks whether or not the unique apparatus information included in the received log-in request is valid. If the unique apparatus information is valid, the authentication unit 71 accepts log-in from the communication apparatus 20, and permits connection to the communication apparatus 20.

When the cooperation request from the information processing apparatus 26 has been received, the cooperation processing unit 72 transmits, to the communication apparatus 20, the received cooperation request. When approval information from the communication apparatus 20 in response to the cooperation request transmitted to the communication apparatus 20 has been received, the cooperation processing unit 72 transmits, to the information processing apparatus 26, approval notification indicating that the cooperation has been approved. Further, when the approval information has been received, the cooperation processing unit 72 registers, in the cooperation information storage unit 46, the cooperation information indicating that the information processing apparatus 26 and the communication apparatus 20 are in cooperation with each other.

When the approval information has been received, the contact list acquisition unit 73 acquires the contact list from the contact list management unit 44. The contact list transmitting unit 74 transmits the contact list acquired by the contact list acquisition unit 73, to each of the information processing apparatus 26 and the communication apparatus 20. In this case, the contact list transmitting unit 74 transmits the same contact list, to each of the information processing apparatus 26 and the communication apparatus 20.

Figure 7:
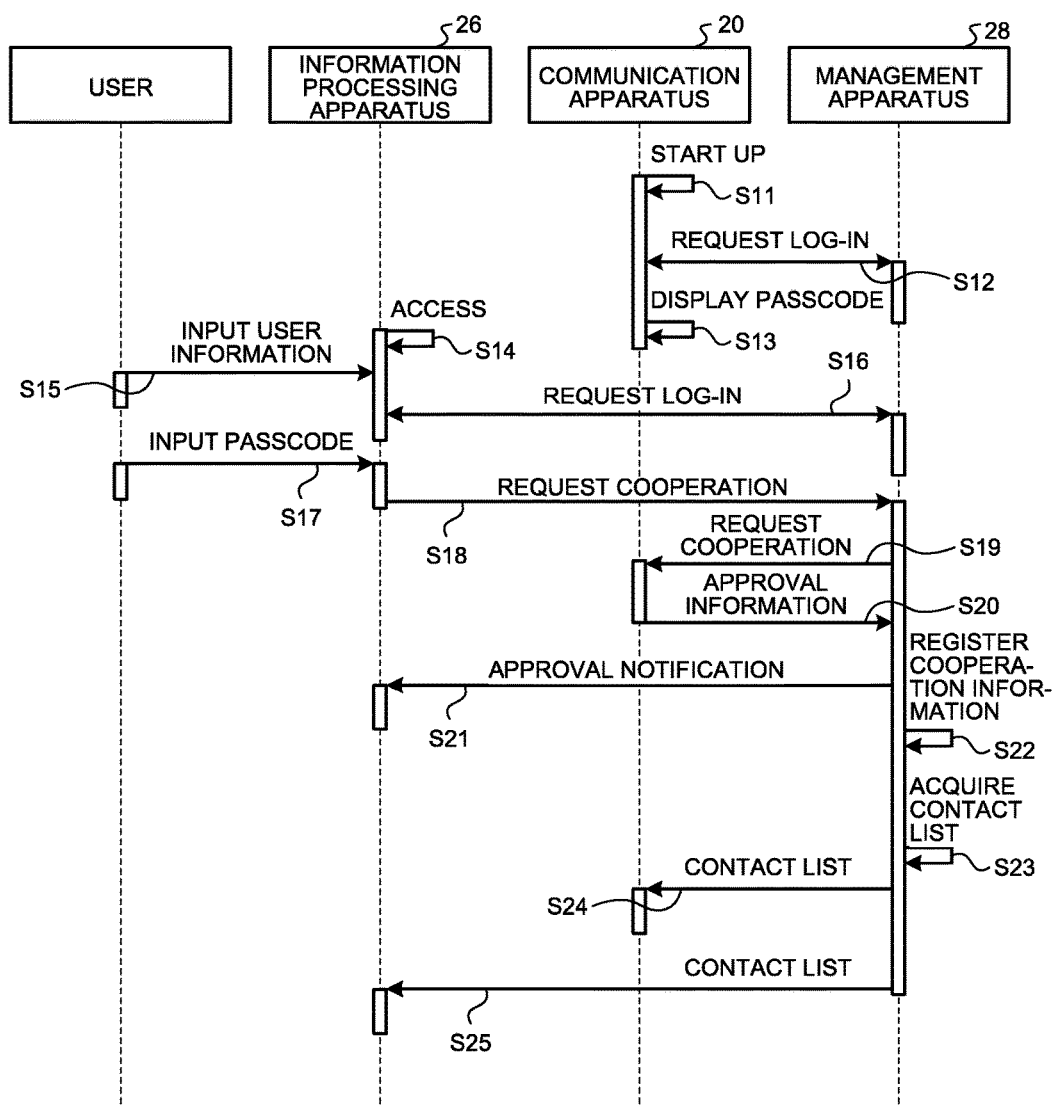
FIG. 7 is a sequence diagram illustrating a flow of processing for establishment of cooperation in the communication system.

FIG. 7 is a sequence diagram illustrating a flow of processing for establishment of cooperation in the communication system 10. At the time of establishment of cooperation, the communication system 10 executes processing according to the flow illustrated in FIG. 7.

Firstly, the communication apparatus 20 is started up by an operation of a user (S11). Subsequently, the second log-in unit 64 in the communication apparatus 20 transmits, to the management apparatus 28, a log-in request including unique apparatus information that has been set beforehand (S12). The authentication unit 71 in the management apparatus 28 receives the log-in request, from the communication apparatus 20, and checks whether or not the unique apparatus information included in the log-in request received from the communication apparatus 20 is valid. If the apparatus information is valid, the authentication unit 71 in the management apparatus 28 notifies the communication apparatus 20 of success in authentication, accepts log-in from the communication apparatus 20, and permits connection to the communication apparatus 20.

Subsequently, when authentication of the apparatus information has succeeded and the log-in has been accepted, the passcode display unit 65 in the communication apparatus 20 displays a passcode to the user (S13). The passcode may be a random numerical value or characters that differs/differ every time it is displayed. Further, the passcode may be a barcode, a two-dimensional code, or the like.

Subsequently, the information processing apparatus 26 accesses a predetermined address provided by the management apparatus 28, through a web browser (S14). Subsequently, the first log-in unit 61 in the information processing apparatus 26 causes the user to input user information (for example, a log-in ID and a password) by displaying a page provided from the predetermined address provided by the management apparatus 28 (S15). Subsequently, the first log-in unit 61 in the information processing apparatus 26 transmits, to the management apparatus 28, a log-in request including the input user information (S16).

The authentication unit 71 in the management apparatus 28 receives the log-in request, from the information processing apparatus 26, and checks whether or not the user information included in the log-in request received from the information processing apparatus 26 is valid. If the user information is valid, the authentication unit 71 in the management apparatus 28 notifies the information processing apparatus 26 of success in authentication, accepts log-in from the information processing apparatus 26, and permits connection to the information processing apparatus 26.

When authentication of the user information has succeeded, and the log-in has been accepted, the cooperation requesting unit 62 in the information processing apparatus 26 causes the user to input a passcode by displaying a page provided from a predetermined address provided by the management apparatus 28 (S17). The user then inputs a passcode displayed by the communication apparatus 20, to the information processing apparatus 26. For example, the user inputs a number or characters to the information processing apparatus 26. Further, if the passcode is a barcode, a two-dimensional code, or the like, the user inputs information by imaging the passcode by using the camera 407 that the information processing apparatus 26 has.

Subsequently, the cooperation requesting unit 62 in the information processing apparatus 26 transmits, to the management apparatus 28, a cooperation request including the passcode input by the user (S18). The cooperation processing unit 72 in the management apparatus 28 receives the cooperation request, from the information processing apparatus 26 (S19).

When the cooperation request has been received from the information processing apparatus 26, the cooperation processing unit 72 in the management apparatus 28 transmits, to the communication apparatus 20, the received cooperation request (S19). The approval unit 66 in the communication apparatus 20 receives the cooperation request, from the management apparatus 28, and determines whether or not the passcode included in the received cooperation request and the passcode displayed by the passcode display unit 65 agree with each other. If the passcode included in the received cooperation request and the passcode displayed by the passcode display unit 65 agree with each other, the approval unit 66 in the communication apparatus 20 transmits, to the management apparatus 28, approval information indicating that the cooperation is approved (S20).

When approval information has been received from the communication apparatus 20 in response to the cooperation request transmitted to the communication apparatus 20, the cooperation processing unit 72 in the management apparatus 28 transmits, to the information processing apparatus 26, approval notification indicating that the cooperation has been approved (S21). Thereby, the information processing apparatus 26 is able to know that the cooperation with the communication apparatus 20 has been established. Further, when the approval information has been received, the cooperation processing unit 72 in the management apparatus 28 registers, in the cooperation information storage unit 46, the cooperation information indicating that the information processing apparatus 26 and the communication apparatus 20 are in cooperation with each other (S22). Thereby, the information processing apparatus 26 and the communication apparatus 20 are thereafter able to perform operation in cooperation with each other.

Further, when the approval information has been received, the contact list acquisition unit 73 in the management apparatus 28 acquires the contact list from the contact list management unit 44 (S23). Subsequently, the contact list transmitting unit 74 in the management apparatus 28 transmits the contact list acquired by the contact list acquisition unit 73, to each of the information processing apparatus 26 and the communication apparatus 20 (S24 and S25). In this case, the contact list transmitting unit 74 transmits the same contact list, to each of the information processing apparatus 26 and the communication apparatus 20.

The second contact list receiving unit 67 in the communication apparatus 20 receives, from the management apparatus 28, the contact list (S24), and registers, in the second contact list storage unit 39, the received contact list. Further, the first contact list receiving unit 63 in the information processing apparatus 26 receives, from the management apparatus 28, the contact list (S25), and registers, in the first contact list storage unit 33, the received contact list.

In this embodiment, the management apparatus 28 acquires a contact list including identification information indicating a partner, to which a user of the information processing apparatus 26 is able to form a connection alone, correspondingly to identification information of the user of the information processing apparatus 26. Thereby, the management apparatus 28 is able to form a connection to a partner that a user of the information processing apparatus 26 is able to form a connection to.

Instead, the management apparatus 28 may acquire a contact list including identification information indicating a partner, to which the communication apparatus 20 is able to form a connection when the communication apparatus 20 is used alone, correspondingly to the identification information of the communication apparatus 20. Further, the management apparatus 28 may acquire a contact list synthesized from: identification information indicating a partner, to which a user of the information processing apparatus 26 is able to form a connection alone; and identification information indicating a partner, to which the communication apparatus 20 is able to form a connection when the communication apparatus 20 is used alone.

Figure 8:
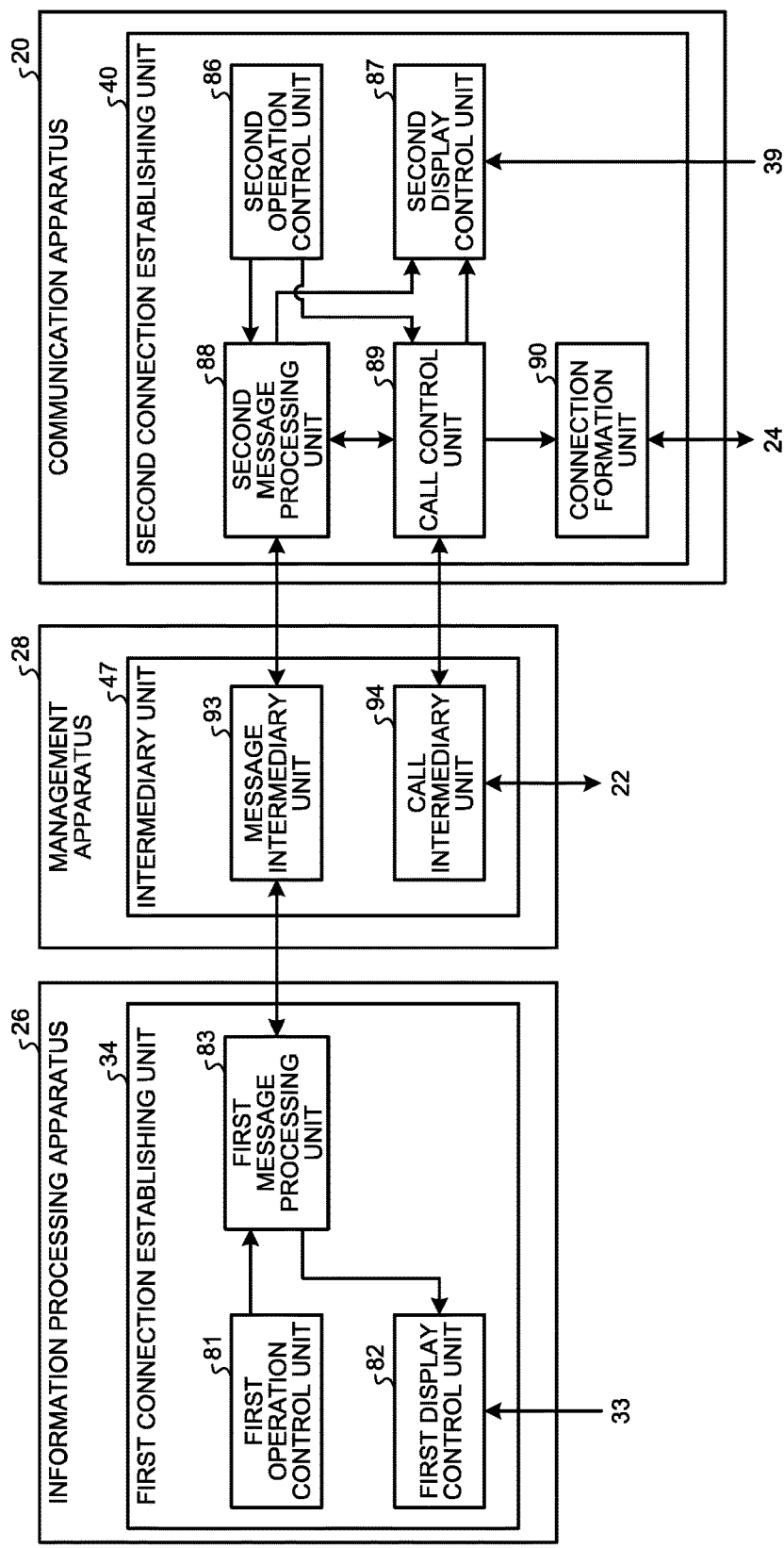
FIG. 8 is a diagram illustrating a functional configuration of a first connection establishing unit, a second connection establishing unit, and an intermediary unit.

FIG. 8 is a diagram illustrating a functional configuration of the first connection establishing unit 34, the second connection establishing unit 40, and the intermediary unit 47.

The first connection establishing unit 34 in the information processing apparatus 26 includes a first operation control unit 81, a first display control unit 82, and a first message processing unit 83. The first operation control unit 81 receives an operation from a user, through the input operation device 403 of the information processing apparatus 26. The first display control unit 82 displays information to a user through the display device 404 of the information processing apparatus 26. The first message processing unit 83 generates a message, and transmits the generated message, to the management apparatus 28. Further, the first message processing unit 83 receives, from the management apparatus 28, a message, and executes processing according to the received message.

The second connection establishing unit 40 in the communication apparatus 20 includes a second operation control unit 86, a second display control unit 87, a second message processing unit 88, a call control unit 89, and a connection formation unit 90. Through the key input device 303 of the communication apparatus 20, the second operation control unit 86 receives an operation from a user. Through the display device 304 of the communication apparatus 20, the second display control unit 87 displays information to the user. The second message processing unit 88 generates a message, and transmits the generated message, to the management apparatus 28. Further, the second message processing unit 88 receives, from the management apparatus 28, a message, and executes processing according to the received message.

The call control unit 89 executes processing related to transmission and reception of a connection request for establishing a connection to the partner apparatus 22. Via the management apparatus 28, the call control unit 89 exchanges transmission and reception of a connection request, and transmission and reception of an approval response and a denial response.

The connection formation unit 90 accesses the relay apparatus 24 and forms a connection to the partner apparatus 22. Specifically, if an approval response to a connection request transmitted has been received, or an approval response to a connection request received has been transmitted, the connection formation unit 90 forms a connection.

The intermediary unit 47 in the management apparatus 28 includes a message intermediary unit 93 and a call intermediary unit 94. The message intermediary unit 93 acts as an intermediary for a message transmitted from the information processing apparatus 26 to the communication apparatus 20, and a message transmitted from the communication apparatus 20 to the information processing apparatus 26.

The call intermediary unit 94 acts as an intermediary for a connection request, an approval response, and a denial response, which are transmitted from the communication apparatus 20 to the partner apparatus 22. Further, the call intermediary unit 94 acts as an intermediary for a connection request, an approval response, and a denial response, which are transmitted from the partner apparatus 22 to the communication apparatus 20.

Figure 9:
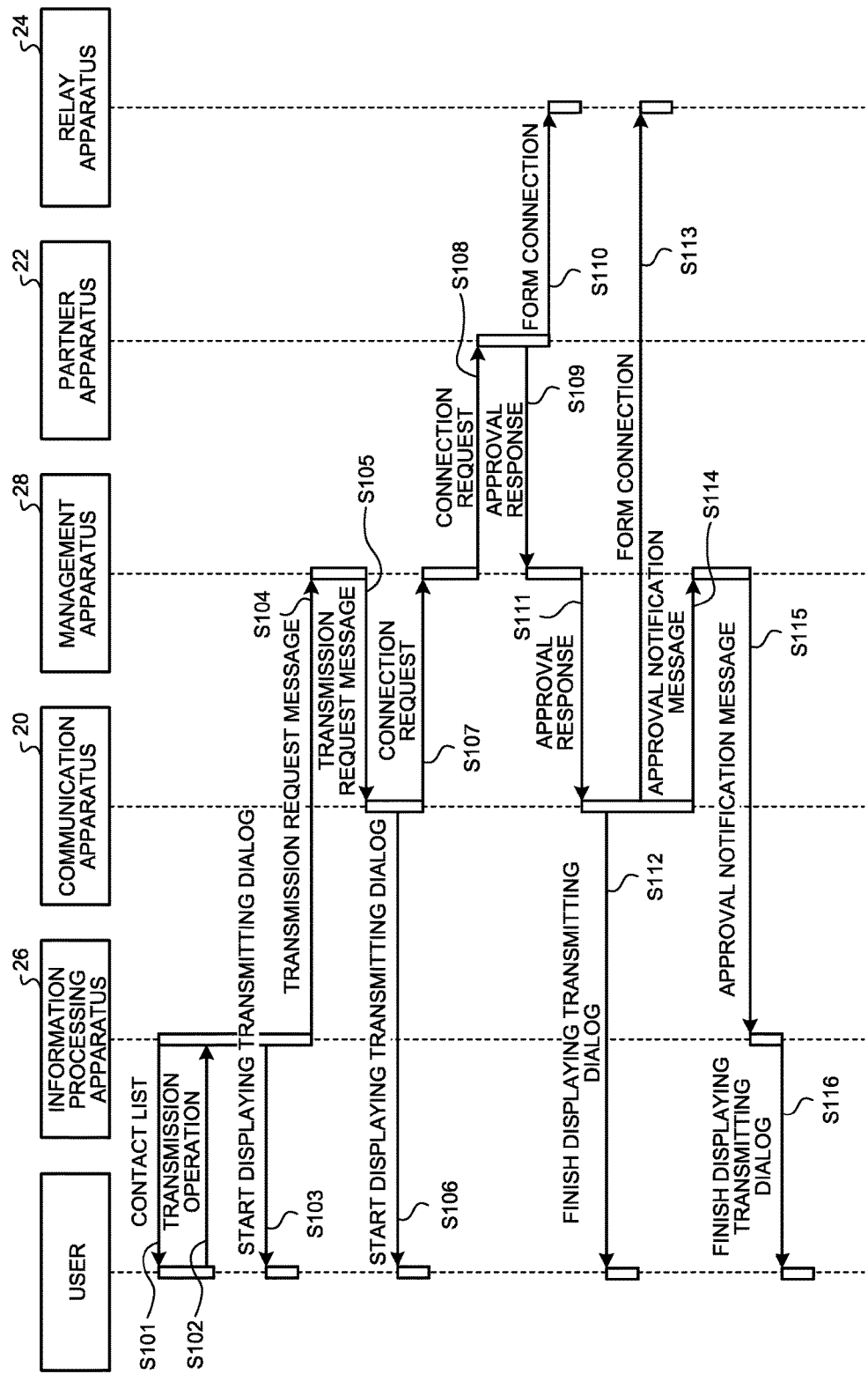
FIG. 9 is a sequence diagram illustrating a flow of processing in a case where a connection request is transmitted by operation of the information processing apparatus.
Figure 10:
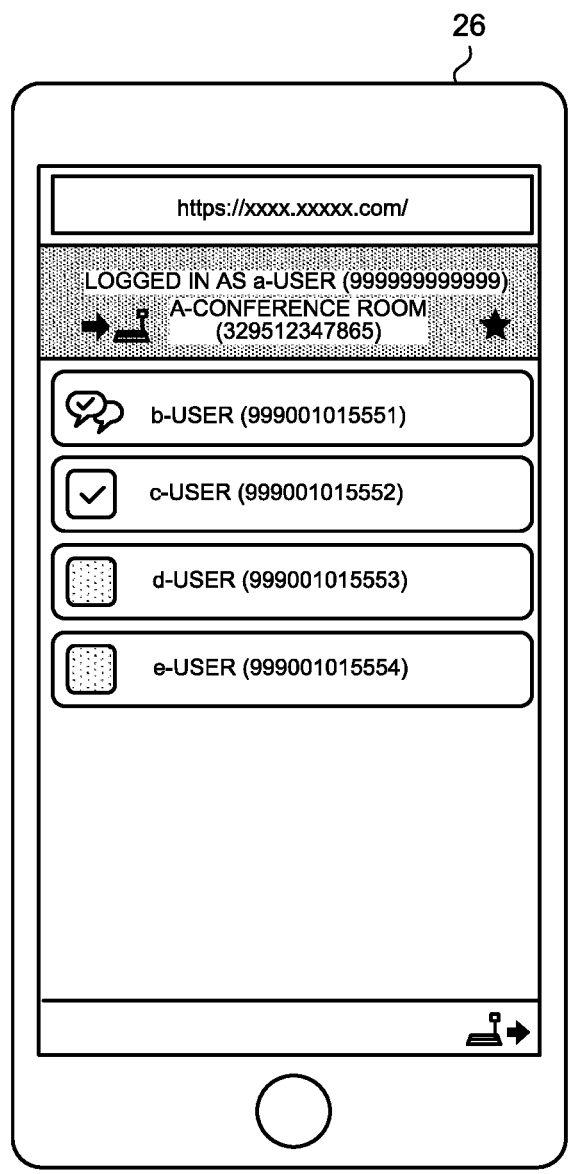
FIG. 10 is a diagram illustrating an example of the information processing apparatus having a contact list displayed thereon.
Figure 11:
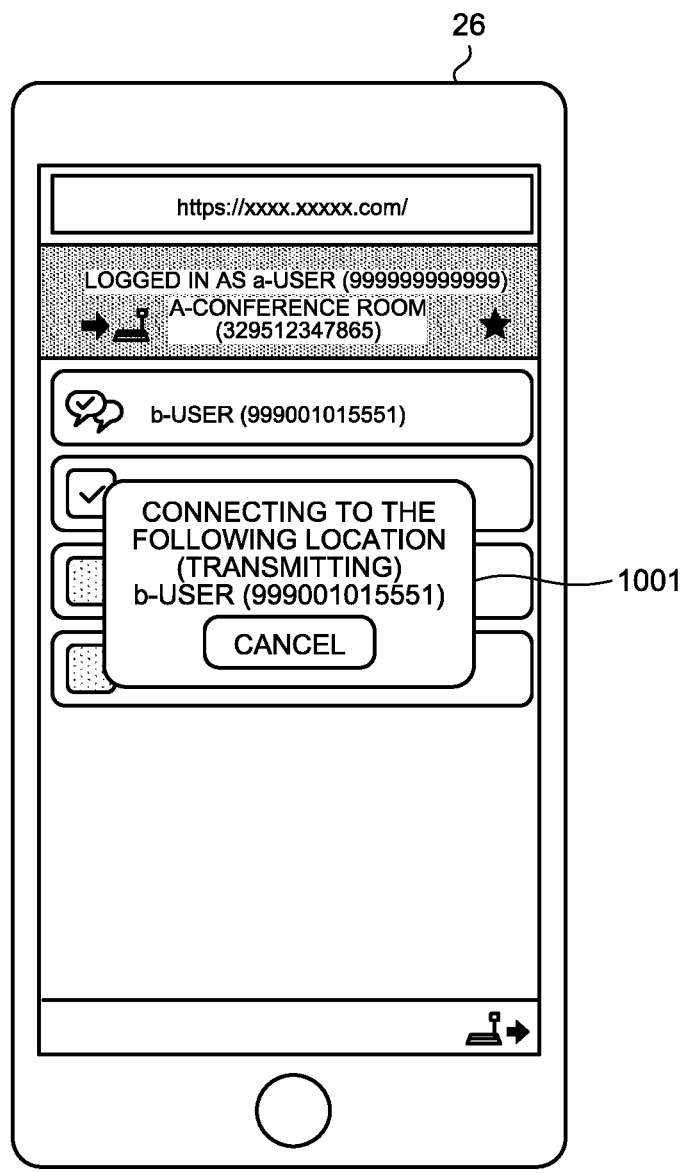
FIG. 11 is a diagram illustrating an example of the information processing apparatus having a transmitting dialog displayed thereon.
Figure 12:
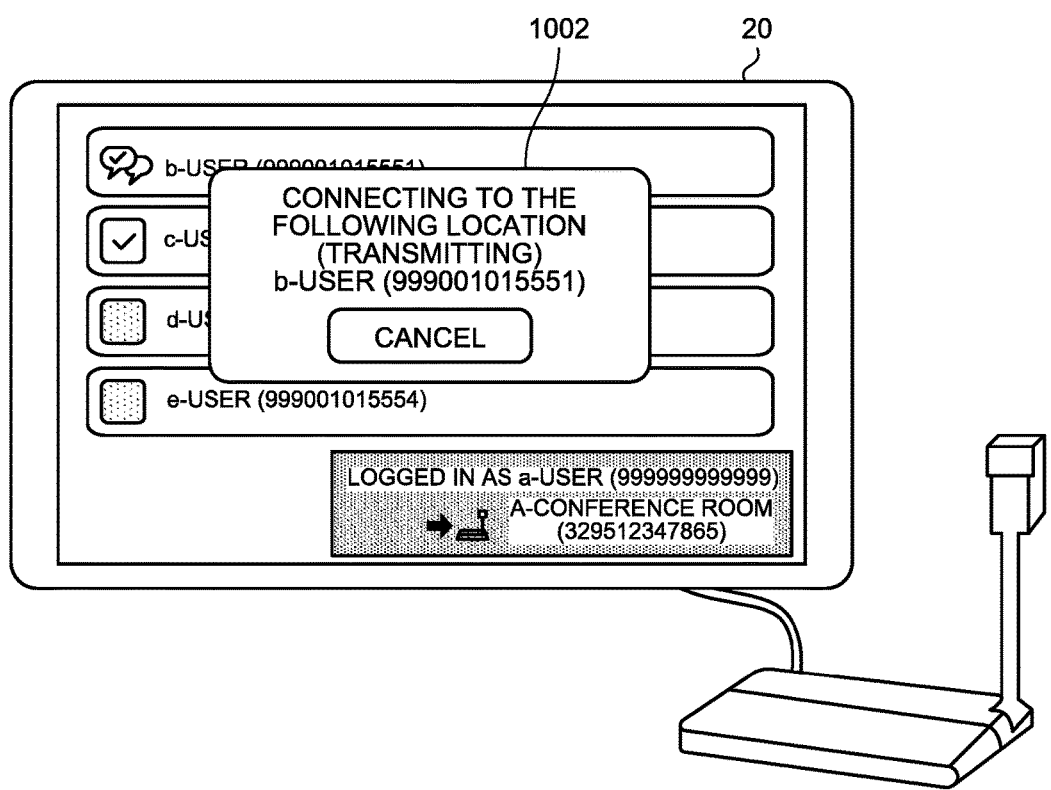
FIG. 12 is a diagram illustrating an example of the communication apparatus having a transmitting dialog displayed thereon.

FIG. 9 is a sequence diagram illustrating a flow of processing in a case where a connection request is transmitted by operation of the information processing apparatus 26. FIG. 10 is a diagram illustrating an example of the information processing apparatus 26 having a contact list displayed thereon. FIG. 11 is a diagram illustrating an example of the information processing apparatus 26 having a transmitting dialog 1001 displayed thereon. FIG. 12 is a diagram illustrating an example of the communication apparatus 20 having a transmitting dialog 1002 displayed thereon.

When a connection request is transmitted by operation of the information processing apparatus 26, the communication system 10 executes processing according to the flow illustrated in FIG. 9.

Firstly, the first display control unit 82 in the information processing apparatus 26 reads the contact list from the first contact list storage unit 33, and displays thereon the read contact list (S101). For example, as illustrated in FIG. 10, it is supposed that the information processing apparatus 26 is logged in through an a-user (identification number=999999999999), and is in cooperation with the communication apparatus 20 in an A-conference room (identification number=329512347856). In this case, the first display control unit 82 in the information processing apparatus 26 displays a contact list including identification numbers of communication partners (for example, a b-user, a c-user, a d-user, and an e-user) that the a-user is able to form connection to.

Subsequently, the first operation control unit 81 in the information processing apparatus 26 receives a selection of the partner apparatus 22 to form a connection to, the selection being from the displayed contact list. Further, the first operation control unit 81 in the information processing apparatus 26 receives a transmission operation for a connection request to the selected partner apparatus 22 (S102).

Subsequently, when the first operation control unit 81 in the information processing apparatus 26 has received the transmission operation, the first display control unit 82 in the information processing apparatus 26 starts displaying the transmitting dialog 1001 (S103). For example, as illustrated in FIG. 11, the first display control unit 82 in the information processing apparatus 26 displays the transmitting dialog 1001 indicating that transmission to the selected partner apparatus 22 is being carried out. The transmitting dialog 1001 may include a cancel button for receiving an operation for stoppage of the transmission processing.

When the first operation control unit 81 in the information processing apparatus 26 has received the transmission operation, the first message processing unit 83 in the information processing apparatus 26 transmits, to the management apparatus 28, a transmission request message (S104). The transmission request message includes the identification information indicating the selected partner apparatus 22.

Subsequently, the message intermediary unit 93 in the management apparatus 28 receives, from the information processing apparatus 26, the transmission request message. When the transmission request message has been received, the message intermediary unit 93 in the management apparatus 28 refers to the cooperation information, identifies the communication apparatus 20 that is in cooperation with the information processing apparatus 26 that is the transmission source of the received transmission request message, and transmits the transmission request message, to the identified communication apparatus 20 (S105).

Subsequently, the second message processing unit 88 in the communication apparatus 20 receives, from the management apparatus 28, the transmission request message. When the transmission request message has been received, the second display control unit 87 in the communication apparatus 20 starts displaying the transmitting dialog 1002 (S106). For example, as illustrated in FIG. 12, the second display control unit 87 in the communication apparatus 20 displays the transmitting dialog 1002 indicating that transmission to the partner apparatus 22 indicated by the identification information included in the transmission request message is being carried out. The transmitting dialog 1002 may include a cancel button for receiving an operation for stoppage of the transmission processing.

Subsequently, when the transmission request message has been received, the call control unit 89 in the communication apparatus 20 transmits, to the management apparatus 28, a connection request (S107). In the connection request, the partner apparatus 22 indicated by the identification information included in the transmission request message is specified as the communication partner.

Subsequently, the call intermediary unit 94 in the management apparatus 28 receives the connection request, from the communication apparatus 20. When the connection request has been received from the communication apparatus 20, the call intermediary unit 94 in the management apparatus 28 transmits the connection request, to the partner apparatus 22 specified as the communication partner (S108).

Subsequently, the partner apparatus 22 receives the connection request, from the management apparatus 28. If, after receiving the connection request, an operation for approval is performed by a user of the partner apparatus 22, the partner apparatus 22 transmits, to the management apparatus 28, an approval response (S109). Further, when the partner apparatus 22 has transmitted the approval response, the partner apparatus 22 accesses the relay apparatus 24, and forms a connection to the communication apparatus 20 (S110).

Subsequently, the call intermediary unit 94 in the management apparatus 28 receives, from the partner apparatus 22, the approval response to the connection request. When the call intermediary unit 94 in the management apparatus 28 has received, from the partner apparatus 22, the approval response; the call intermediary unit 94 transmits the approval response, to the communication apparatus 20 that is the transmission source of the connection request (S111).

Subsequently, the call control unit 89 in the communication apparatus 20 receives, from the management apparatus 28, the approval response to the connection request transmitted. When the approval response has been received, the second display control unit 87 in the communication apparatus 20 finishes displaying the transmitting dialog 1002 (S112). The second display control unit 87 in the communication apparatus 20 finishes displaying, for example, the transmitting dialog 1002 illustrated in FIG. 12.

When the approval response has been received, the connection formation unit 90 in the communication apparatus 20 accesses the relay apparatus 24, and forms a connection to the partner apparatus 22 (S113). Further, when the approval response has been received, the second message processing unit 88 in the communication apparatus 20 transmits, to the management apparatus 28, an approval notification message (S114).

Subsequently, the message intermediary unit 93 in the management apparatus 28 receives the approval notification message, from the communication apparatus 20. When the approval notification message has been received, the message intermediary unit 93 in the management apparatus 28 refers to the cooperation information, identifies the information processing apparatus 26 that is in cooperation with the communication apparatus 20, which is the transmission source of the received approval notification message, and transmits, to the identified information processing apparatus 26, an approval notification message (S115).

Subsequently, the first message processing unit 83 in the information processing apparatus 26 receives the approval notification message, from the management apparatus 28. When the approval notification message has been received, the first display control unit 82 in the information processing apparatus 26 finishes displaying the transmitting dialog 1001 (S116). The first display control unit 82 in the information processing apparatus 26 finishes displaying, for example, the transmitting dialog 1001 illustrated in FIG. 11.

If a denial operation has been performed by a user, the partner apparatus 22 transmits, to the management apparatus 28, a denial response (S109). In this case, the communication system 10 executes the following processing.

When the partner apparatus 22 has transmitted the denial response, the partner apparatus 22 does not form a connection to the communication apparatus 20 (does not execute S110). Further, when the denial response has been received from the partner apparatus 22, the call intermediary unit 94 in the management apparatus 28 transmits the denial response, to the communication apparatus 20, which is the transmission source of the connection request (S111).

When the denial response has been received, the second display control unit 87 in the communication apparatus 20 finishes displaying the transmitting dialog 1002 (S112). Further, when the denial response has been received, the connection formation unit 90 in the communication apparatus 20 does not form a connection to the partner apparatus 22 (does not execute S113). Furthermore, when the denial response has been received, the second message processing unit 88 in the communication apparatus 20 transmits, to the management apparatus 28, a denial notification message (S114).

When the denial notification message has been received from the communication apparatus 20, the message intermediary unit 93 in the management apparatus 28 identifies the information processing apparatus 26 that is in cooperation with the communication apparatus 20, which is the transmission source of the denial notification message, and transmits the denial notification message, to the identified information processing apparatus 26 (S115). The first message processing unit 83 in the information processing apparatus 26 receives the denial notification message, from the management apparatus 28. When the denial notification message has been received, the first display control unit 82 in the information processing apparatus 26 finishes displaying the transmitting dialog 1001 (S116).

As indicated by the above sequence, when a connection is formed between the partner apparatus 22 and the communication apparatus 20 in the communication system 10, a connection request is able to be transmitted by operation of the information processing apparatus 26 that is different from the communication apparatus 20. Further, since the information processing apparatus 26 and the communication apparatus 20 are operated in cooperation with each other in the communication system 10, a connection is able to be formed between the communication apparatus 20 and the partner apparatus 22, to which a user of the information processing apparatus 26 is able to form a connection.

Figure 13:
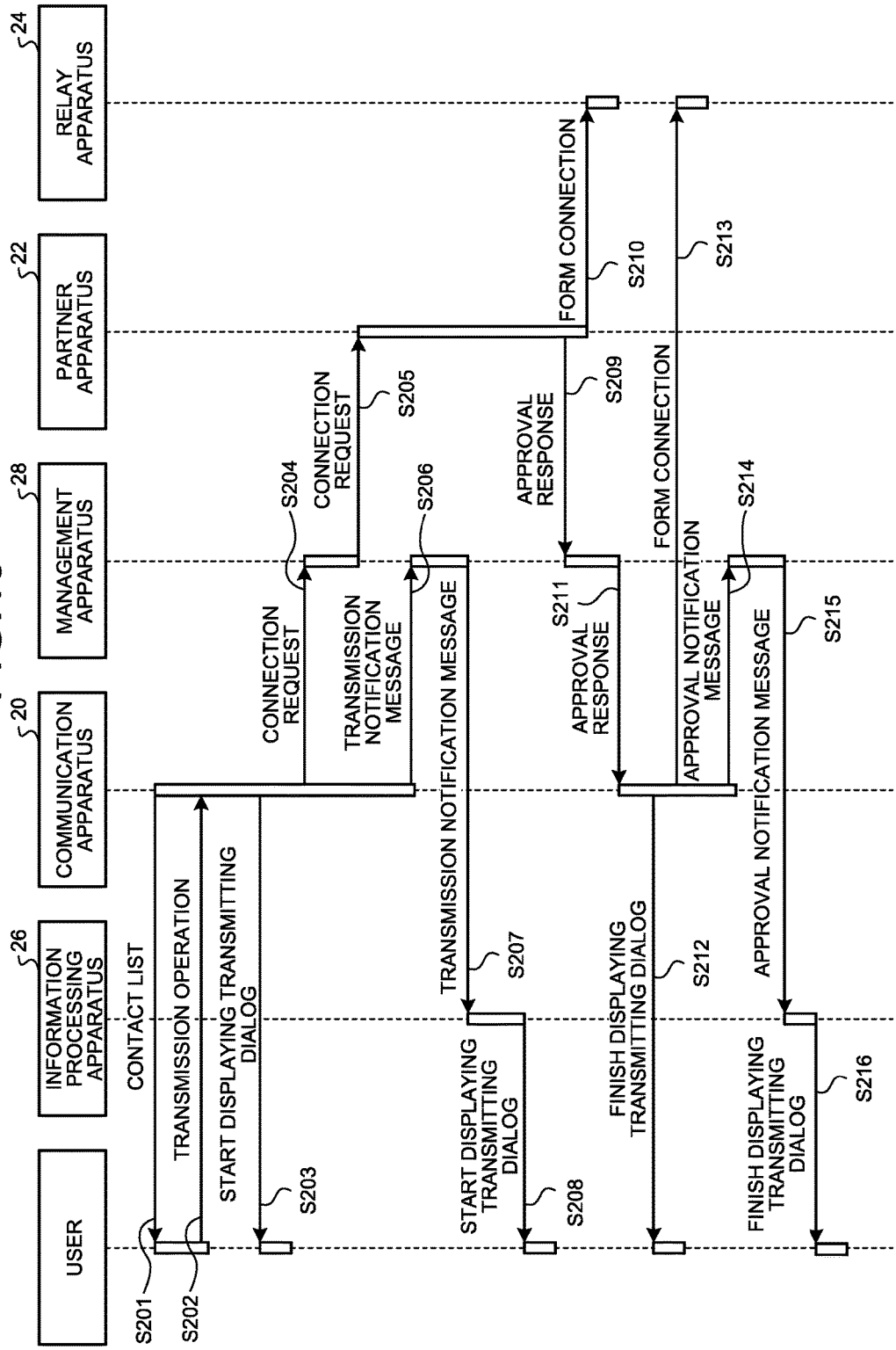
FIG. 13 is a sequence diagram illustrating a flow of processing in a case where a connection request is transmitted by operation of the communication apparatus.
Figure 14:
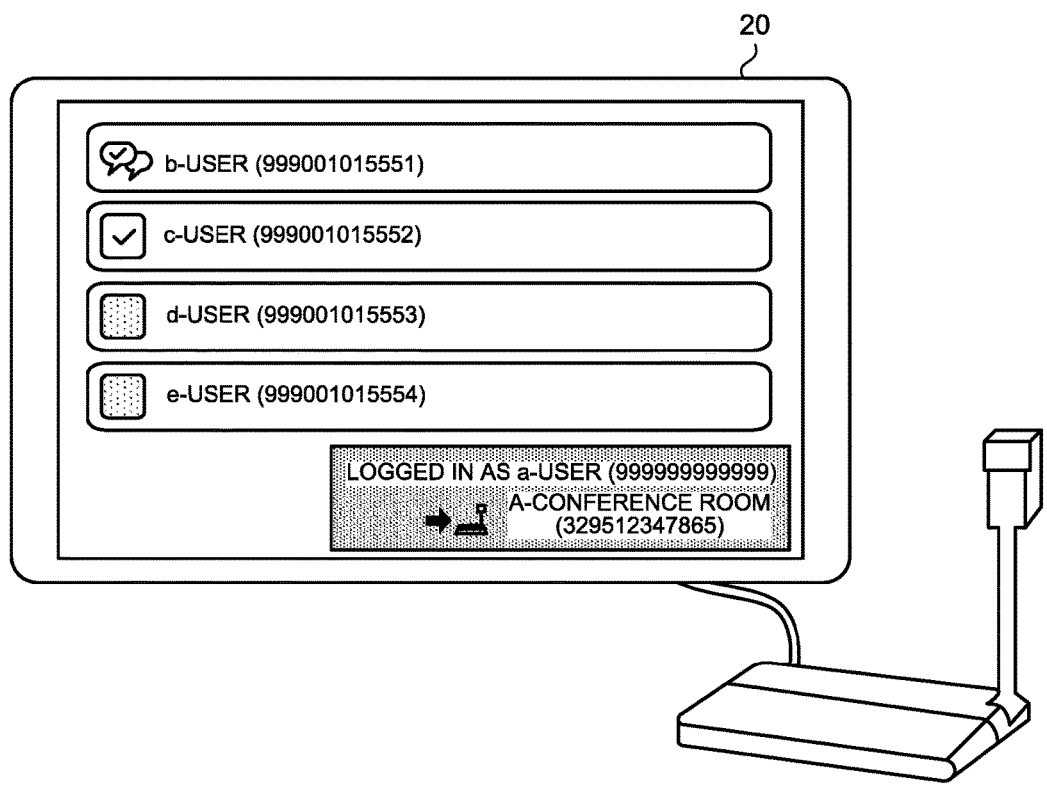
FIG. 14 is a diagram illustrating an example of the communication apparatus having a contact list displayed thereon.

FIG. 13 is a sequence diagram illustrating a flow of processing in a case where a connection request is transmitted by operation of the communication apparatus 20. FIG. 14 is a diagram illustrating an example of the communication apparatus 20 having a contact list displayed thereon.

When a connection request is transmitted by operation of the communication apparatus 20, the communication system 10 executes processing according to the flow illustrated in FIG. 13.

Firstly, the second display control unit 87 in the communication apparatus 20 reads the contact list from the second contact list storage unit 39, and displays thereon the read contact list (S201). For example, as illustrated in FIG. 14, it is supposed that the communication apparatus 20 (identification number=239612347856) in the A-conference room is in cooperation with the information processing apparatus 26 logged in by the a-user (identification number=9999999999). In this case, the second display control unit 87 in the communication apparatus 20 displays thereon a contact list including identification numbers of communication partners (for example, the b-user, the c-user, the d-user, and the e-user) that the a-user is able to form connection to.

Subsequently, the second operation control unit 86 in the communication apparatus 20 receives a selection of the partner apparatus 22, to which a connection is formed, from the displayed contact list. Further, the second operation control unit 86 in the communication apparatus 20 receives a transmission operation for a connection request to the selected partner apparatus 22 (S202).

Subsequently, when the second operation control unit 86 in the communication apparatus 20 has received the transmission operation, the second display control unit 87 in the communication apparatus 20 starts displaying thereon the transmitting dialog 1002 (S203). The second display control unit 87 in the communication apparatus 20 displays, for example, the transmitting dialog 1002 as illustrated in FIG. 12.

Subsequently, when the second operation control unit 86 in the communication apparatus 20 receives the transmission operation, the call control unit 89 in the communication apparatus 20 transmits, to the management apparatus 28, a connection request (S204). In the connection request, the partner apparatus 22, which has been selected by the second operation control unit 86 in the communication apparatus 20, has been specified as the communication partner.

Subsequently, the call intermediary unit 94 in the management apparatus 28 receives the connection request, from the communication apparatus 20. When the call intermediary unit 94 in the management apparatus 28 has received the connection request, the call intermediary unit 94 transmits the connection request, to the partner apparatus 22 specified as a communication partner (S205).

Further, when the connection request has been transmitted, the second message processing unit 88 in the communication apparatus 20 transmits, to the management apparatus 28, a transmission notification message (S206). The transmission notification message includes the identification information indicating the partner apparatus 22 specified as the communication partner in the connection request.

Subsequently, the message intermediary unit 93 in the management apparatus 28 receives the transmission notification message, from the communication apparatus 20. When the message intermediary unit 93 in the management apparatus 28 has received the transmission notification message, the message intermediary unit 93 refers to the cooperation information, identifies the information processing apparatus 26 that is in cooperation with the communication apparatus 20, which is the transmission source of the received transmission notification message, and transmits the transmission notification message, to the identified information processing apparatus 26 (S207).

Subsequently, the first message processing unit 83 in the information processing apparatus 26 receives the transmission notification message. When the transmission notification message has been received, the first display control unit 82 in the information processing apparatus 26 starts displaying the transmitting dialog 1001 (S208). The first display control unit 82 in the information processing apparatus 26 displays thereon, for example, the transmitting dialog 1001 as illustrated in FIG. 11.

The partner apparatus 22 then receives the connection request, from the management apparatus 28. If, after receiving the connection request, an operation for approval is performed by a user of the partner apparatus 22, the partner apparatus 22 transmits, to the management apparatus 28, an approval response (S209). Further, if an operation for denial is performed by a user of the partner apparatus 22, the partner apparatus 22 transmits, to the management apparatus 28, a denial response (S209).

The communication system 10 thereafter executes processing of S210 to S216 similarly to the flow of the processing from S110 to S116 illustrated in FIG. 9.

As indicated by the above sequence, when a connection is formed between the partner apparatus 22 and the communication apparatus 20 in the communication system 10, a connection request is able to be transmitted also by operation of the communication apparatus 20. Therefore, in the communication system 10, a connection request is able to be transmitted by operation of both the communication apparatus 20 that forms a connection to the partner apparatus 22, and the information processing apparatus 26 that is different from the communication apparatus 20.

Figure 15:
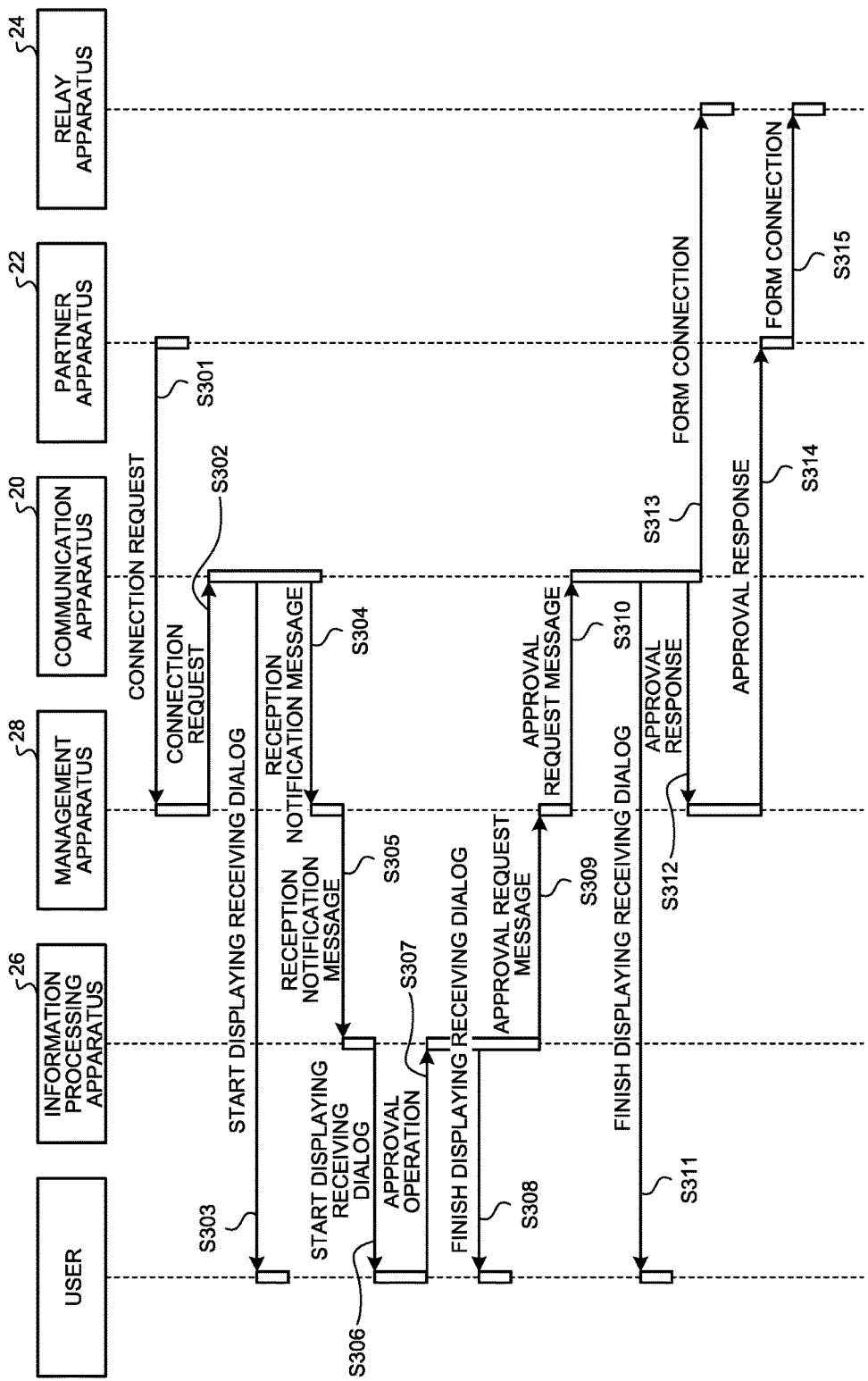
FIG. 15 is a sequence diagram illustrating a flow of processing in a case where a connection request is received by operation of the information processing apparatus.
Figure 16:
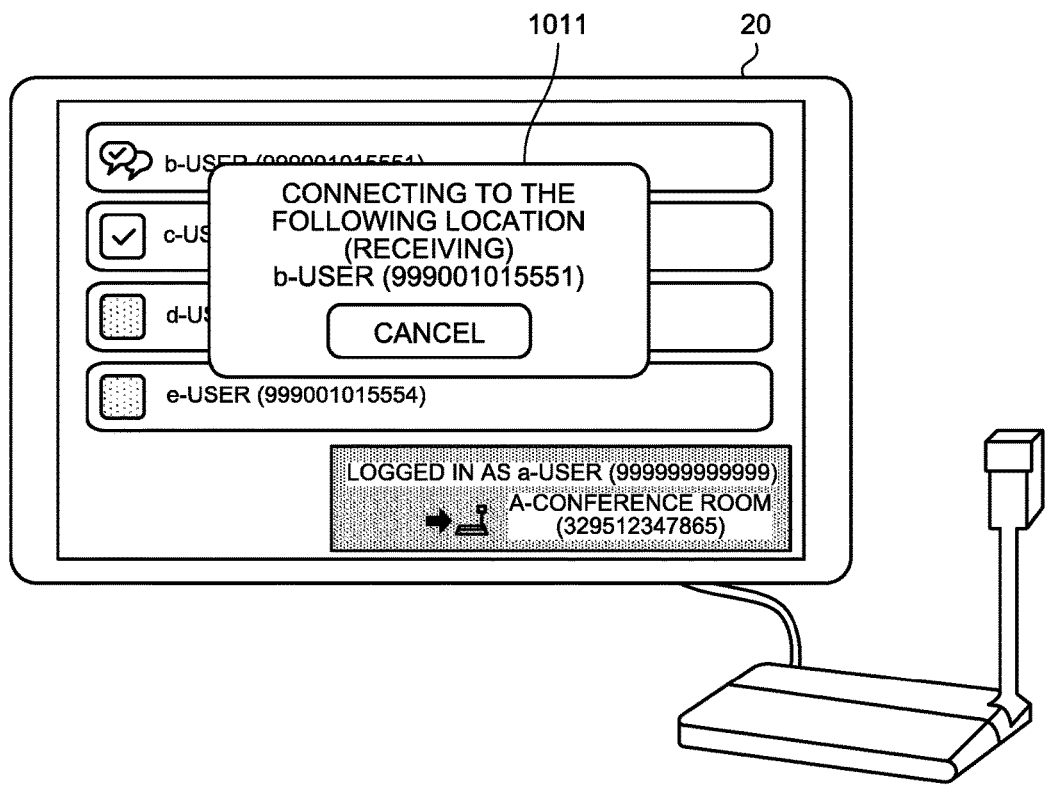
FIG. 16 is a diagram illustrating an example of the communication apparatus having a receiving dialog displayed thereon.
Figure 17:
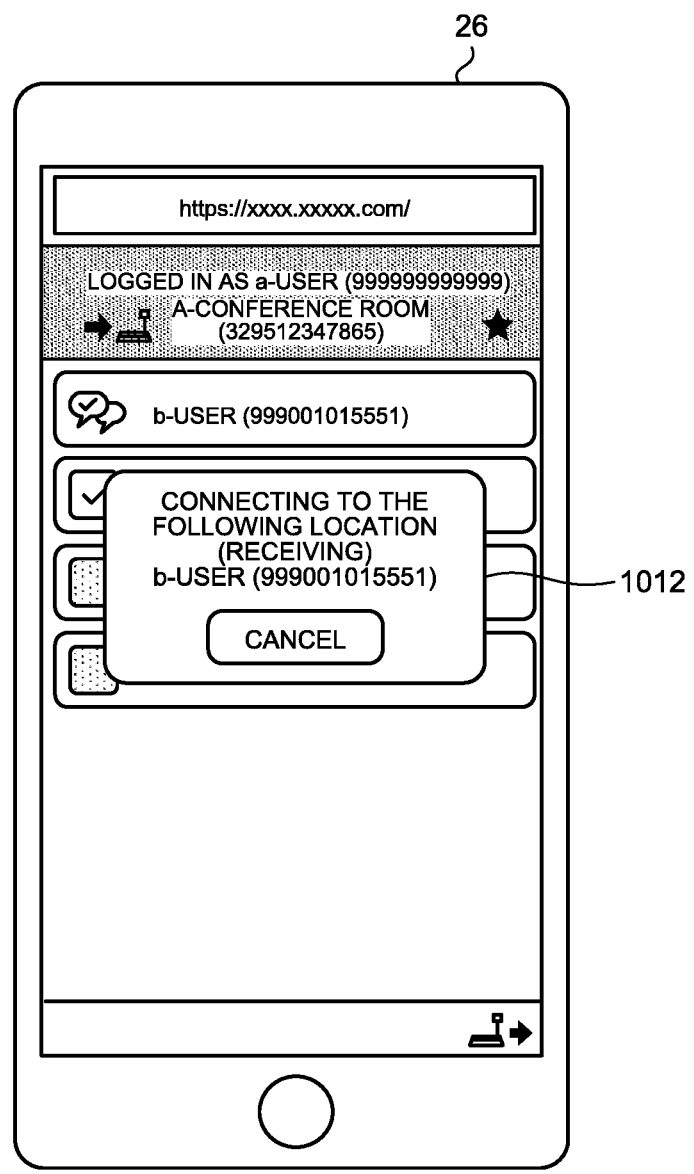
FIG. 17 is a diagram illustrating an example of the information processing apparatus having a receiving dialog displayed thereon.

FIG. 15 is a sequence diagram illustrating a flow of processing in a case where a connection request is received by operation of the information processing apparatus 26. FIG. 16 is a diagram illustrating an example of the communication apparatus 20 having a receiving dialog 1011 displayed thereon. FIG. 17 is a diagram illustrating an example of the information processing apparatus 26 having a receiving dialog 1012 displayed thereon.

When a connection request from the partner apparatus 22 is received by operation of the information processing apparatus 26, the communication system 10 executes processing according to the flow illustrated in FIG. 15.

Firstly, when a transmission operation has been performed by a user, the partner apparatus 22 transmits, to the management apparatus 28, a connection request directed to the information processing apparatus 26 or the communication apparatus 20 (S301). In this case, in the connection request, the information processing apparatus 26 or the communication apparatus 20 has been specified as the communication partner.

Subsequently, the call intermediary unit 94 in the management apparatus 28 receives the connection request, from the partner apparatus 22. When the connection request has been received from the partner apparatus 22, the call intermediary unit 94 in the management apparatus 28 determines whether the information processing apparatus 26 has been specified or the communication apparatus 20 has been specified, as the communication partner. If the information processing apparatus 26 has been specified as the communication partner, the call intermediary unit 94 in the management apparatus 28 refers to the cooperation information, identifies the communication apparatus 20 that is in cooperation with the information processing apparatus 26, and transmits the connection request, to the identified communication apparatus 20 (S302). Further, if the communication apparatus 20 has been specified as the communication partner, the call intermediary unit 94 in the management apparatus 28 transmits the connection request, to the specified communication apparatus 20. That is, even if one of the information processing apparatus 26 and the communication apparatus 20 that operate in cooperation with each other has been specified as the communication partner, the call intermediary unit 94 in the management apparatus 28 transmits the connection request, to the communication apparatus 20 that is able to execute call control.

Subsequently, the call control unit 89 in the communication apparatus 20 receives the connection request, from the management apparatus 28. When the connection request has been received, the second display control unit 87 in the communication apparatus 20 starts displaying the receiving dialog 1011 (S303). For example, as illustrated in FIG. 16, the second display control unit 87 in the communication apparatus 20 displays thereon the receiving dialog 1011 indicating that reception from the partner apparatus 22, which is the transmission source of the connection request, is being carried out. The receiving dialog 1011 may include a button for approval of the reception, and a button for denial of the reception.

Furthermore, when the connection request has been received, the second message processing unit 88 in the communication apparatus 20 transmits, to the management apparatus 28, a reception notification message (S304). The reception notification message includes the identification information indicating the partner apparatus 22, which is the transmission source of the connection request.

Subsequently, the message intermediary unit 93 in the management apparatus 28 receives the reception notification message, from the communication apparatus 20. When the message intermediary unit 93 in the management apparatus 28 has received the reception notification message, the message intermediary unit 93 refers to the cooperation information, identifies the information processing apparatus 26 that is in cooperation with the communication apparatus 20, which is the transmission source of the received reception notification message, and transmits the reception notification message, to the identified information processing apparatus 26 (S305).

Subsequently, the first message processing unit 83 in the information processing apparatus 26 receives the reception notification message. When the reception notification message has been received, the first display control unit 82 in the information processing apparatus 26 starts displaying the receiving dialog 1012 (S306). For example, as illustrated in FIG. 17, the first display control unit 82 in the information processing apparatus 26 displays the receiving dialog 1012 indicating that reception from the partner apparatus 22, of which the identification information has been included in the reception notification message, is being carried out. The receiving dialog 1012 may include a button for approval of the reception and a button for denial of the reception.

Subsequently, the first operation control unit 81 in the information processing apparatus 26 receives an approval operation for approval of the reception (S307). When the first operation control unit 81 in the information processing apparatus 26 has received the approval operation, the first display control unit 82 in the information processing apparatus 26 finishes displaying the receiving dialog 1012 (S308). The first display control unit 82 in the information processing apparatus 26 finishes displaying, for example, the receiving dialog 1012 illustrated in FIG. 17.

Subsequently, when the first operation control unit 81 in the information processing apparatus 26 has received the approval operation, the first message processing unit 83 in the information processing apparatus 26 transmits, to the management apparatus 28, an approval request message (S309).

Subsequently, the message intermediary unit 93 in the management apparatus 28 receives the approval request message, from the information processing apparatus 26. When the message intermediary unit 93 in the management apparatus 28 has received the approval request message, the message intermediary unit 93 refers to the cooperation information, identifies the communication apparatus 30 that is in cooperation with the information processing apparatus 26, which is the transmission source of the received approval request message, and transmits the approval request message, to the identified communication apparatus 20 (S310).

Subsequently, the second message processing unit 88 in the communication apparatus 20 receives the approval request message, from the management apparatus 28. When the approval request message has been received, the second display control unit 87 in the communication apparatus 20 finishes displaying the receiving dialog 1011 (S311). The second display control unit 87 in the communication apparatus 20 finishes displaying, for example, the receiving dialog 1011 illustrated in FIG. 16.

Subsequently, when the approval request message has been received, the call control unit 89 in the communication apparatus 20 transmits, to the management apparatus 28, an approval response (S312). Further, when the approval response has been transmitted, the connection formation unit 90 in the communication apparatus 20 accesses the relay apparatus 24, and forms a connection to the partner apparatus 22 (S313).

Subsequently, the call intermediary unit 94 in the management apparatus 28 receives, from the communication apparatus 20, the approval response to the connection request transmitted. When the call intermediary unit 94 in the management apparatus 28 has received the approval response, the call intermediary unit 94 transmits the approval response received from the communication apparatus 20, to the partner apparatus 22, which is the transmission source of the connection request (S314).

Subsequently, the partner apparatus 22 receives the approval response, from the management apparatus 28. When the partner apparatus 22 has received the approval response, the partner apparatus 22 accesses the relay apparatus 24, and forms a connection to the communication apparatus 20 (S315).

The first operation control unit 81 in the information processing apparatus 26 may receive a denial operation for denial of the reception (S307). In this case, the communication system 10 executes the following processing.

When the first operation control unit 81 in the information processing apparatus 26 has received the denial operation, the first display control unit 82 in the information processing apparatus 26 finishes displaying the receiving dialog 1012 (S308). Further, when the first operation control unit 81 in the information processing apparatus 26 has received the denial operation, the first message processing unit 83 in the information processing apparatus 26 transmits, to the management apparatus 28, a denial request message (S309).

Subsequently, the message intermediary unit 93 in the management apparatus 28 receives the denial request message, from the information processing apparatus 26. When the message intermediary unit 93 in the management apparatus 28 has received the denial request message, the message intermediary unit 93 refers to the cooperation information, identifies the communication apparatus 20 that is in cooperation with the information processing apparatus 26, which is the transmission source of the received denial request message, and transmits the denial request message, to the identified communication apparatus 20 (S310).

Subsequently, the second message processing unit 88 in the communication apparatus 20 receives the denial request message, from the management apparatus 28. When the denial request message has been received, the second display control unit 87 in the communication apparatus 20 finishes displaying thereon the receiving dialog 1011 (S311).

When the denial request message has been received, the call control unit 89 in the communication apparatus 20 transmits, to the management apparatus 28, a denial response (S312). When the denial response has been transmitted, the connection formation unit 90 in the communication apparatus 20 does not form a connection to the partner apparatus 22 (does not execute S313).

Subsequently, the call intermediary unit 94 in the management apparatus 28 receives, from the communication apparatus 20, the denial response to the connection request. The call intermediary unit 94 in the management apparatus 28 then transmits the denial response received, to the partner apparatus 22, which is the transmission source of the connection request (S314).

Subsequently, the partner apparatus 22 receives the denial response, from the management apparatus 28. When the partner apparatus 22 has received the denial response, the partner apparatus 22 does not form a connection to the communication apparatus 20 (does not execute S315).

As indicated by the above sequence, in the communication system 10, through the information processing apparatus 26 that is different from the communication apparatus 20, an approval operation and a denial operation in response to a connection request received from the partner apparatus 22 are able to be performed.

Figure 18:
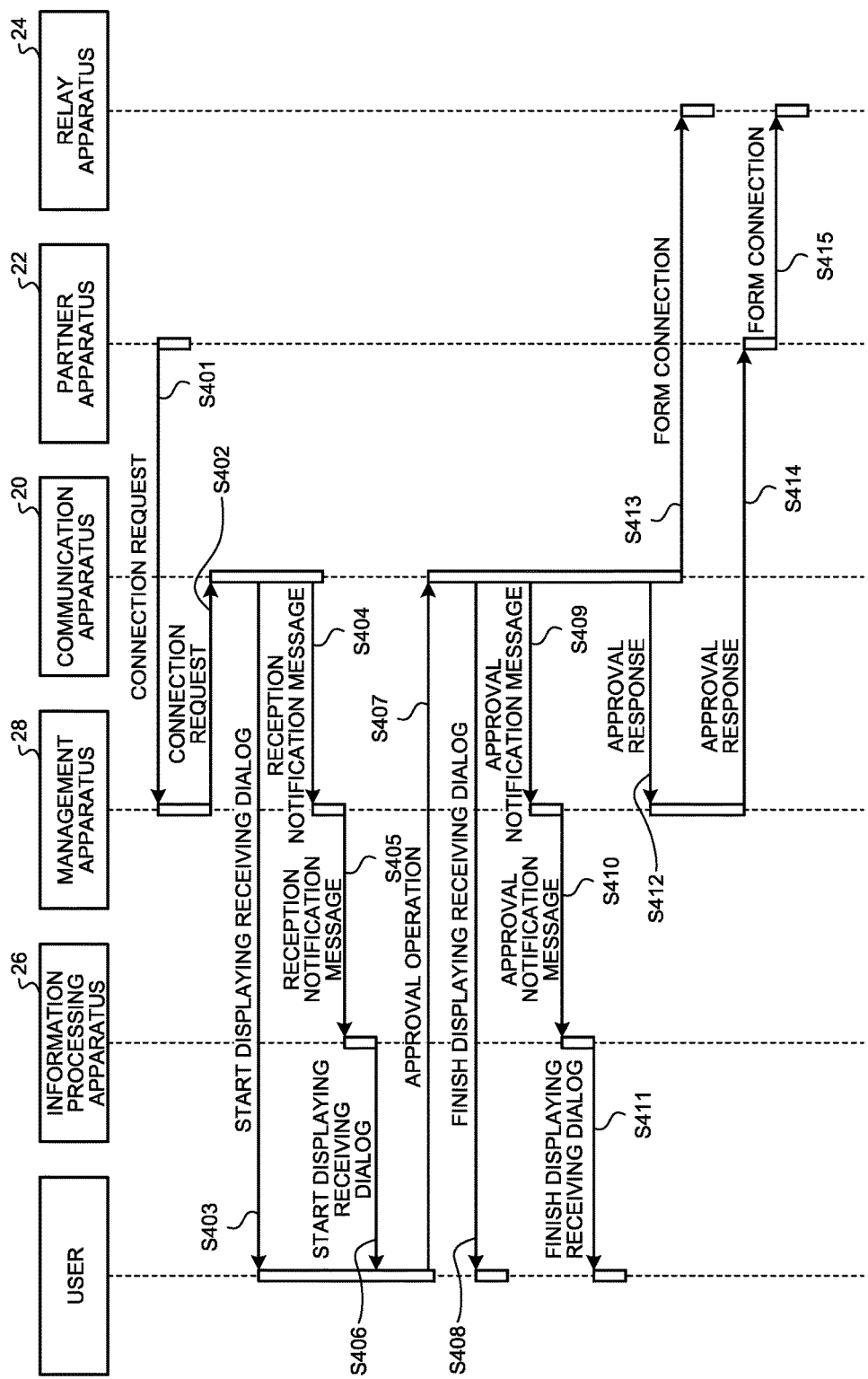
FIG. 18 is a sequence diagram illustrating a flow of processing in a case where a connection request is received by operation of the communication apparatus.

FIG. 18 is a sequence diagram illustrating a flow of processing in a case where a connection request is received by operation of the communication apparatus 20.

When a connection request is received by operation of the communication apparatus 20, the communication system 10 executes processing according to the flow illustrated in FIG. 18.

Firstly, the communication system 10, hereinafter, executes processing of S401 to S406 similarly to the flow of the processing from S301 to S306 illustrated in FIG. 15.

Subsequently, the second operation control unit 86 in the communication apparatus 20 receives an approval operation for approval of the reception (S407). When the second operation control unit 86 in the communication apparatus 20 has received the approval operation, the second display control unit 87 in the communication apparatus 20 finishes displaying the receiving dialog 1011 (S408). The second display control unit 87 in the communication apparatus 20 finishes displaying, for example, the receiving dialog 1011 illustrated in FIG. 16.

Subsequently, when the second operation control unit 86 in the communication apparatus 20 has received the approval operation, the second message processing unit 88 in the communication apparatus 20 transmits, to the management apparatus 28, an approval notification message (S409).

Subsequently, the message intermediary unit 93 in the management apparatus 28 receives the approval notification message, from the communication apparatus 20. When the message intermediary unit 93 in the management apparatus 28 has received the approval notification message, the message intermediary unit 93 refers to the cooperation information, identifies the information processing apparatus 26 that is in cooperation with the communication apparatus 20, which is the transmission source of the received approval notification message, and transmits the approval notification message, to the identified information processing apparatus 26 (S410).

Subsequently, the first message processing unit 83 in the information processing apparatus 26 receives, from the management apparatus 28, the approval notification message. When the approval notification message has been received, the first display control unit 82 in the information processing apparatus 26 finishes displaying the receiving dialog 1012 (S411). The first display control unit 82 in the information processing apparatus 26 finishes displaying, for example, the receiving dialog 1012 illustrated in FIG. 17.

Further, when the second operation control unit 86 in the communication apparatus 20 has received the approval operation, the call control unit 89 in the communication apparatus 20 transmits, to the management apparatus 28, an approval response (S412). Furthermore, if the approval response has been transmitted, the connection formation unit 90 in the communication apparatus 20 accesses the relay apparatus 24, and forms a connection to the partner apparatus 22 (S413).

Subsequently, the call intermediary unit 94 in the management apparatus 28 receives, from the communication apparatus 20, the approval response to the connection request transmitted. When the call intermediary unit 94 in the management apparatus 28 has received the approval response, the call intermediary unit 94 transmits the approval response, to the partner apparatus 22, which is the transmission source of the connection request (S414).

Subsequently, the partner apparatus 22 receives the approval response, from the management apparatus 28. When the partner apparatus 22 has received the approval response, the partner apparatus 22 accesses the relay apparatus 24, and forms a connection to the communication apparatus 20 (S415).

The second operation control unit 86 in the communication apparatus 20 may receive a denial operation for denial of the reception (S407). In this case, the communication system 10 executes the following processing.

When the second operation control unit 86 in the communication apparatus 20 has received the denial operation, the second display control unit 87 in the communication apparatus 20 finishes displaying the receiving dialog 1011 (S408). Further, when the second operation control unit 86 in the communication apparatus 20 has received the denial operation, the second message processing unit 88 in the communication apparatus 20 transmits, to the management apparatus 28, a denial notification message (S409).

Subsequently, the message intermediary unit 93 in the management apparatus 28 receives, from the communication apparatus 20, the denial notification message. When the message intermediary unit 93 in the management apparatus 28 has received the denial notification message, the message intermediary unit 93 refers to the cooperation information, identifies the information processing apparatus 26 that is in cooperation with the communication apparatus 20, which is the transmission source of the received denial notification message, and transmits, to the identified information processing apparatus 26, the denial notification message (S410).

Subsequently, the first message processing unit 83 in the information processing apparatus 26 receives, from the management apparatus 28, the denial notification message. When the denial notification message has been received, the first display control unit 82 in the information processing apparatus 26 finishes displaying the receiving dialog 1012 (S411).

Further, when the second operation control unit 86 in the communication apparatus 20 has received the approval operation, the call control unit 89 in the communication apparatus 20 transmits, to the management apparatus 28, a denial response (S412). When the denial response has been transmitted, the connection formation unit 90 in the communication apparatus 20 does not form a connection to the partner apparatus 22 (does not execute S413).

Subsequently, the call intermediary unit 94 in the management apparatus 28 receives, from the communication apparatus 20, the denial response to the connection request. When the call intermediary unit 94 in the management apparatus 28 has received the denial response, the call intermediary unit 94 transmits the denial response, to the partner apparatus 22, which is the transmission source of the connection request (S414).

Subsequently, the partner apparatus 22 receives, from the management apparatus 28, the denial response. When the partner apparatus 22 has received the denial response, the partner apparatus 22 does not form a connection to the communication apparatus 20 (does not execute S415).

As indicated by the above sequence, in the communication system 10, through the communication apparatus 20, an approval operation and a denial operation in response to a connection request received are able to be performed. Therefore, in the communication system 10, an approval operation and a denial operation in response to a connection request received are able to be performed through both: the communication apparatus 20 that forms a connection to the partner apparatus 22; and the information processing apparatus 26 that is different from the communication apparatus 20.

Figure 19:
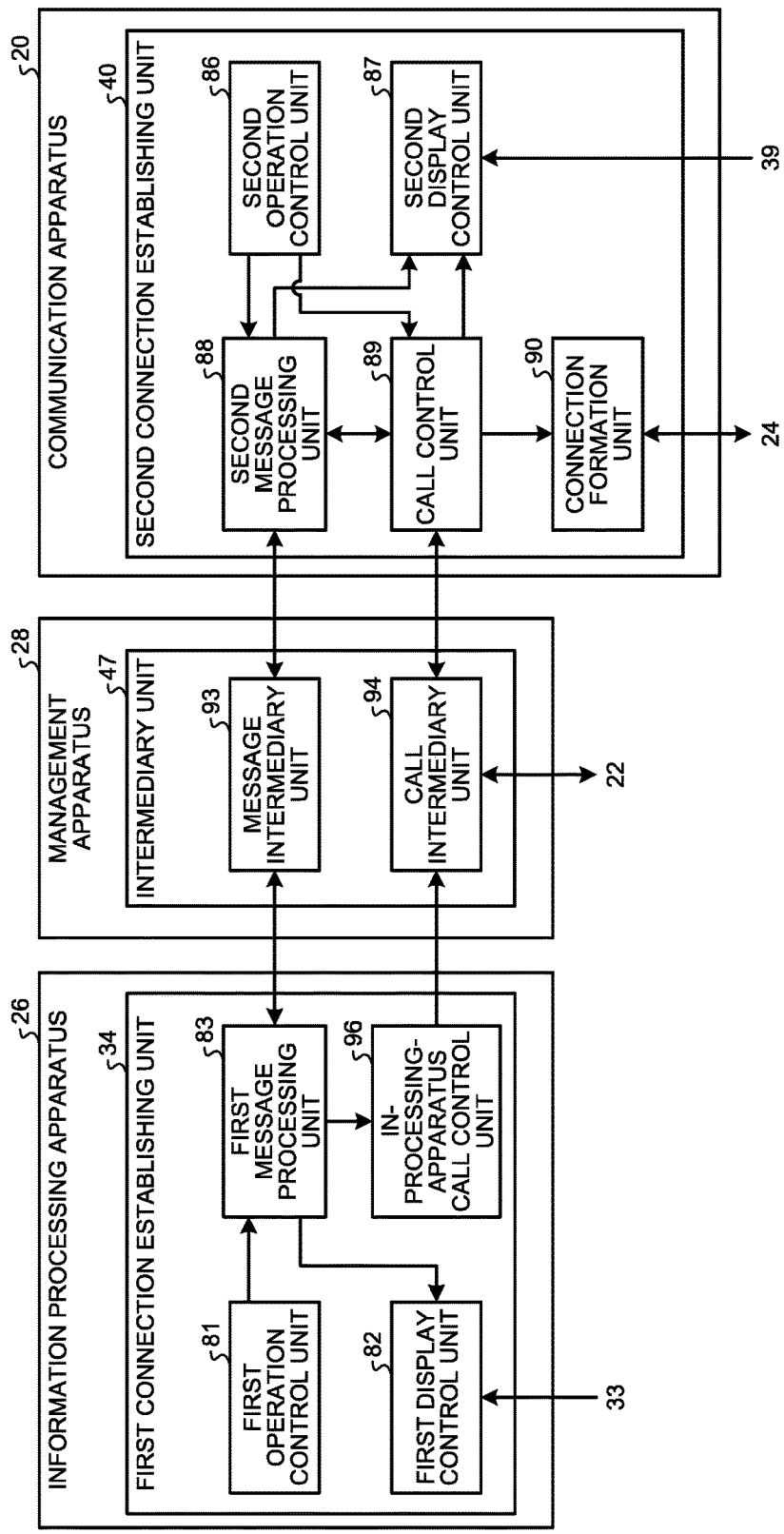
FIG. 19 is a diagram illustrating a functional configuration of a first connection establishing unit, a second connection establishing unit, and an intermediary unit, according to a modification.

FIG. 19 is a diagram illustrating a functional configuration of a first connection establishing unit 34, the second connection establishing unit 40, and the intermediary unit 47, according to a modification.

In a communication system 10 according to the modification, an approval response or a denial response to a connection request received is able to be transmitted from an information processing apparatus 26. In this case, the first connection establishing unit 34 in the information processing apparatus 26 further includes, as illustrated in FIG. 19, an in-processing-apparatus call control unit 96.

The in-processing-apparatus call control unit 96 executes processing related to transmission and reception of a connection request for establishing a connection to the partner apparatus 22. For example, the in-processing-apparatus call control unit 96 transmits an approval response and a denial response to connection requests received.

Figure 20:
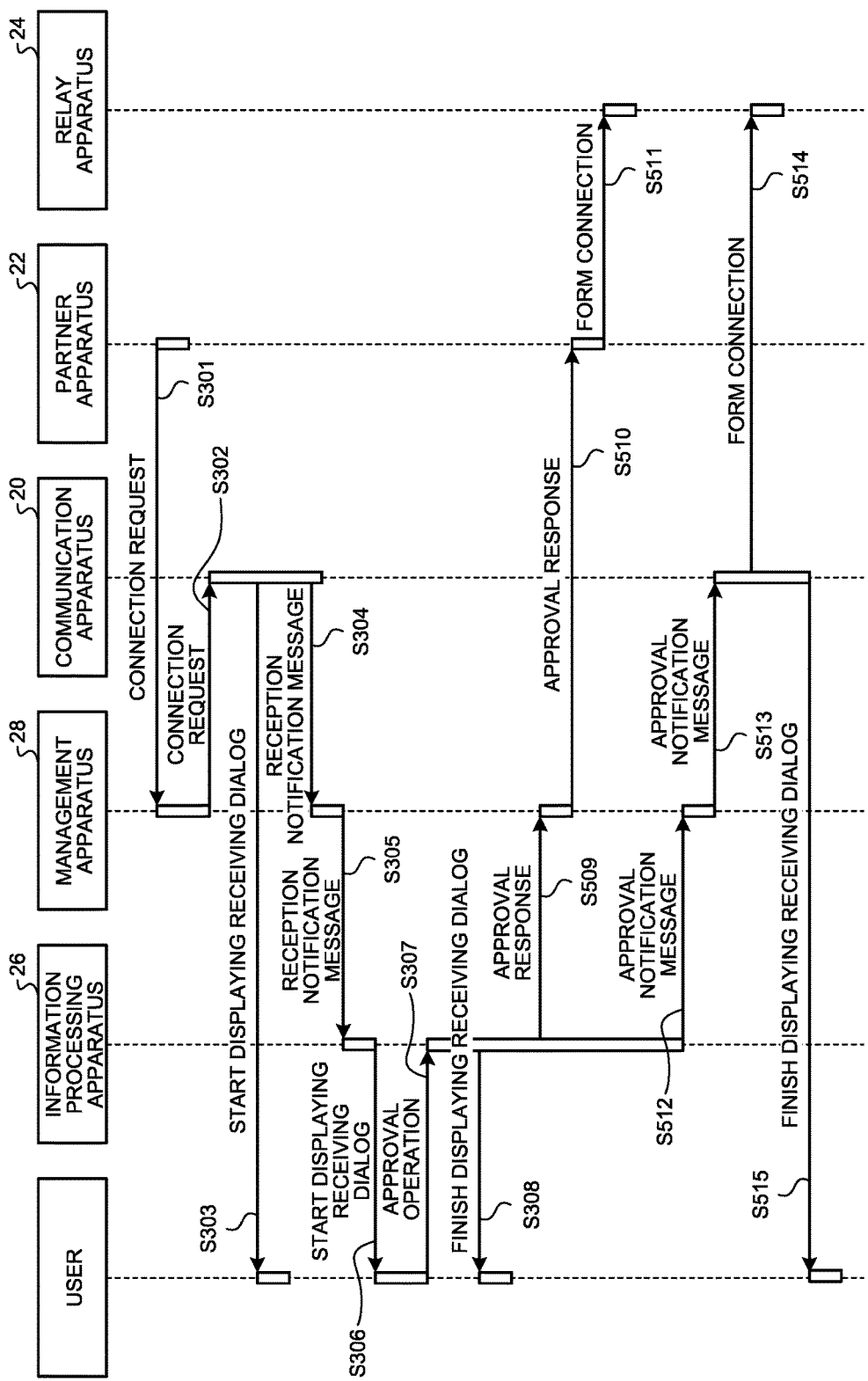
FIG. 20 is a sequence diagram illustrating a flow of processing in a case where a connection request is received by operation of an information processing apparatus, according to the modification.

FIG. 20 is a sequence diagram illustrating a flow of processing when a connection request is received by operation of the information processing apparatus 26, according to the modification.

In the modification, when a connection request is received by operation of the communication apparatus 20, the communication system 10 executes processing according to the flow illustrated in FIG. 20. Firstly, the communication system 10 executes the same processing as S301 to S308 illustrated in FIG. 15.

Subsequently, when the first operation control unit 81 in the information processing apparatus 26 has received the approval operation, the in-processing-apparatus call control unit 96 in the information processing apparatus 26 transmits, to the management apparatus 28, an approval response (S509).

The call intermediary unit 94 in the management apparatus 28 receives, from the information processing apparatus 26, the approval response to the connection request transmitted. When the call intermediary unit 94 in the management apparatus 28 has received the approval response, the call intermediary unit 94 transmits the approval response, to the partner apparatus 22, which is the transmission source of the connection request (S510).

Subsequently, the partner apparatus 22 receives, from the management apparatus 28, the approval response. When the partner apparatus 22 has received the approval response, the partner apparatus 22 accesses the relay apparatus 24, and forms a connection to the communication apparatus 20 (S511).

Further, when the first operation control unit 81 in the information processing apparatus 26 has received the approval operation, the first message processing unit 83 in the information processing apparatus 26 transmits, to the management apparatus 28, an approval notification message (S512).

Subsequently, the message intermediary unit 93 in the management apparatus 28 receives, from the information processing apparatus 26, the approval notification message. When the message intermediary unit 93 in the management apparatus 28 has received the approval notification message, the message intermediary unit 93 refers to the cooperation information, identifies the communication apparatus 20 that is in cooperation with the information processing apparatus 26, which is the transmission source of the received approval notification message, and transmits, to the identified communication apparatus 20, the approval notification message (S513).

Subsequently, the second message processing unit 88 in the communication apparatus 20 receives the approval notification message, from the management apparatus 28. When the approval notification message has been received, the connection formation unit 90 in the communication apparatus 20 accesses the relay apparatus 24, and forms a connection to the partner apparatus 22 (S514).

Further, when the approval notification message has been received, the second display control unit 87 in the communication apparatus 20 finishes displaying the receiving dialog 1011 (S515). The second display control unit 87 in the communication apparatus 20 finishes displaying, for example, the receiving dialog 1011 illustrated in FIG. 16.

When the first operation control unit 81 in the information processing apparatus 26 receives the denial operation, the communication system 10 executes the following processing. When the first operation control unit 81 in the information processing apparatus 26 has received the denial operation, the in-processing-apparatus call control unit 96 in the information processing apparatus 26 transmits, to the management apparatus 28, a denial response (S509).

The call intermediary unit 94 in the management apparatus 28 receives, from the information processing apparatus 26, the denial response to the connection request transmitted. When the denial response has been received, the call intermediary unit 94 in the management apparatus 28 transmits the denial response, to the partner apparatus 22, which is the transmission source of the connection request (S510).

Subsequently, the partner apparatus 22 receives, from the management apparatus 28, the denial response. When the partner apparatus 22 has received the denial response, the partner apparatus 22 does not form a connection to the communication apparatus 20 (does not execute S511).

Further, when the first operation control unit 81 in the information processing apparatus 26 has received the denial operation, the first message processing unit 83 in the information processing apparatus 26 transmits, to the management apparatus 28, a denial notification message (S512).

Subsequently, the message intermediary unit 93 in the management apparatus 28 receives, from the information processing apparatus 26, the denial notification message. When the message intermediary unit 93 in the management apparatus 28 has received the denial notification message, the message intermediary unit 93 refers to the cooperation information, identifies the communication apparatus 20 that is in cooperation with the information processing apparatus 26, which is the transmission source of the received denial notification message, and transmits, to the identified communication apparatus 20, the denial notification message (S513).

Subsequently, the second message processing unit 88 in the communication apparatus 20 receives, from the management apparatus 28, the denial notification message. When the denial notification message has been received, the connection formation unit 90 in the communication apparatus 20 does not form a connection to the partner apparatus 22 (does not execute S514). Further, when the denial notification message has been received, the second display control unit 87 in the communication apparatus 20 finishes displaying the receiving dialog 1011 (S515).

As indicated by the above sequence, in the communication system 10 according to the modification, from the communication apparatus 20, an approval response and a denial response to connection requests received are able to be transmitted.

FIG. 21 is a diagram illustrating a description example of request messages. In the communication system 10, for example, a transmission request message, an approval request message, and a denial request message, which have been formatted as illustrated in FIG. 21, may be used. The messages illustrated in FIG. 21 have been described in JSON format. Further, the value after "cid" in the transmission request message is identification information indicating the destination.

FIG. 22 is a diagram illustrating a description example of notification messages. In the communication system 10, for example, a transmission notification message, a reception notification message, an approval notification message, a denial notification message, and an error notification message, which have been formatted as illustrated in FIG. 22, may be used. The messages illustrated in FIG. 22 have been described in JSON format.

Further, the value after "to" in the transmission notification message is identification information indicating the transmission destination of the connection request. The value after "from" in the reception notification message is identification information indicating the transmission source of the connection request.

Further, the error notification message is transmitted and received when an error occurs at any stage. The value after "code" in the error notification message is a number that identifies the content of the error.

A program executed by the information processing apparatus 26 according to the above described embodiment is executed by being downloaded by the information processing apparatus 26 via a web browser through a network. Further, the program executed by the information processing apparatus 26 may be provided by being recorded in a computer readable recording medium, such as a CD-ROM, a flexible disk (FD), a CD-R, or a DVD, in a file of an installable format or executable format. Furthermore, the program executed by the information processing apparatus 26 may be provided or distributed via a network, such as the Internet, or may be provided by being incorporated in a ROM or the like beforehand.

Further, a program executed by the communication apparatus 20 and the management apparatus 28, according to the embodiment, may be provided by being recorded in a computer readable recording medium, such as a CD-ROM, a flexible disk (FD), a CD-R, or a DVD, in a file of an installable format or executable format. Furthermore, the program executed by the communication apparatus 20 and the management apparatus 28, according to the embodiment, may be provided or distributed via a network, such as the Internet, or may be provided by being incorporated in a ROM or the like beforehand.

A program that causes a computer to function as the information processing apparatus 26 includes a first display input module, a first cooperation establishing module, a first contact list storage module, and a first connection establishing module. In the computer, a processor functions as the first display input unit 31, the first cooperation establishing unit 32, the first contact list storage unit 33, and the first connection establishing unit 34, by the processor executing these modules. A part of these functional blocks may be realized by hardware.

Further, a program that causes a computer to function as the communication apparatus 20 includes a second display input module, a second cooperation establishing module, a second contact list storage module, a second connection establishing module, and a communication module. In the computer, a processor functions as the second display input unit 37, the second cooperation establishing unit 38, the second contact list storage unit 39, the second connection establishing unit 40, and the communication unit 41, by the processor executing these modules. A part of these functional blocks may be realized by hardware.

Further, a program that causes a computer to function as the management apparatus 28 includes a contact list management module, a cooperation control module, a cooperation information storage module, and an intermediary module. In the computer, a processor functions as the contact list management unit 44, the cooperation control unit 45, the cooperation information storage unit 46, and the intermediary unit 47, by the processor executing these modules. A part of these functional blocks may be realized by hardware.

Hereinbefore, embodiments of the present invention have been described, but the embodiments have been presented as examples, and are not intended for limitation of the scope of the invention. These new embodiments may be implemented in any of various other modes.

An embodiment provides an effect of enabling operation through an information processing apparatus when a communication path is established between a communication apparatus and a partner apparatus, the information processing apparatus being different from the communication apparatus.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST

10 COMMUNICATION SYSTEM
20 COMMUNICATION APPARATUS
22 PARTNER APPARATUS
24 RELAY APPARATUS
26 INFORMATION PROCESSING APPARATUS
28 MANAGEMENT APPARATUS
31 FIRST DISPLAY INPUT UNIT
32 FIRST COOPERATION ESTABLISHING UNIT
33 FIRST CONTACT LIST STORAGE UNIT
34 FIRST CONNECTION ESTABLISHING UNIT
37 SECOND DISPLAY INPUT UNIT
38 SECOND COOPERATION ESTABLISHING UNIT
39 SECOND CONTACT LIST STORAGE UNIT
40 SECOND CONNECTION ESTABLISHING UNIT
41 COMMUNICATION UNIT
44 CONTACT LIST MANAGEMENT UNIT
45 COOPERATION CONTROL UNIT
46 COOPERATION INFORMATION STORAGE UNIT
47 INTERMEDIARY UNIT
51 VOICE ACQUISITION UNIT
52 IMAGING PROCESSING UNIT
53 SYNTHESIZING UNIT
54 TRANSMITTING AND RECEIVING UNIT
55 SEPARATING UNIT
56 VOICE OUTPUT UNIT
57 DISPLAY OUTPUT UNIT
61 FIRST LOG-IN UNIT
62 COOPERATION REQUESTING UNIT
63 FIRST CONTACT LIST RECEIVING UNIT
64 SECOND LOG-IN UNIT
65 PASSCODE DISPLAY UNIT
66 APPROVAL UNIT
67 SECOND CONTACT LIST RECEIVING UNIT
71 AUTHENTICATION UNIT
72 COOPERATION PROCESSING UNIT
73 CONTACT LIST ACQUISITION UNIT
74 CONTACT LIST TRANSMITTING UNIT
81 FIRST OPERATION CONTROL UNIT
82 FIRST DISPLAY CONTROL UNIT
83 FIRST MESSAGE PROCESSING UNIT
86 SECOND OPERATION CONTROL UNIT
87 SECOND DISPLAY CONTROL UNIT
88 SECOND MESSAGE PROCESSING UNIT
89 CALL CONTROL UNIT
90 CONNECTION FORMATION UNIT
93 MESSAGE INTERMEDIARY UNIT
94 CALL INTERMEDIARY UNIT
96 IN-PROCESSING-APPARATUS CALL CONTROL UNIT

What is claimed is:

1. A communication system comprising:
a communication apparatus;
a partner apparatus to which a communication path from the communication apparatus via a network is configured to be established;
an information processing apparatus configured to operate in cooperation with the communication apparatus; and
a management apparatus configured to manage the communication path between the communication apparatus and the partner apparatus, and cooperation between the communication apparatus and the information processing apparatus, wherein
the information processing apparatus comprises:
a first operation control unit configured to receive a transmission operation for a connection request to the partner apparatus; and
a first message processing unit configured to transmit, to the management apparatus, a transmission request message including identification information indicating the partner apparatus, when the transmission operation has been received,
the management apparatus comprises:
a message intermediary unit configured to identify the communication apparatus that is in cooperation with the information processing apparatus that is a transmission source of the transmission request message, and transmit the transmission request message to the identified communication apparatus, when the transmission request message has been received from the information processing apparatus,
the communication device comprises:

a second message processing unit configured to receive the transmission request message from the management apparatus; and a call control unit configured to transmit the connection request to the management apparatus, when the transmission request message has been received, the connection request specifying, as a communication partner, the partner apparatus indicated by the identification information included in the transmission request message, the management apparatus further comprises:

a call intermediary unit configured to transmit the connection request to the partner apparatus, when the connection request has been received from the communication apparatus, the connection request specifying the partner apparatus as the communication partner, and transmit, to the communication apparatus that is a transmission source of the connection request, an approval response to the connection request, when the approval response has been received from the partner apparatus, the communication device further comprises:

a connection formation unit configured to establish a communication path to the partner apparatus, when the approval response has been received, the call intermediary unit in the management apparatus is configured to, when the connection request specifying, as a communication partner, the communication apparatus or the information processing apparatus has been received from the partner apparatus, transmit the connection request to the communication apparatus, the call control unit in the communication apparatus is configured to receive the connection request, the second message processing unit in the communication apparatus is configured to transmit a reception notification message to the management apparatus, when the connection request has been received, the message intermediary unit in the management apparatus is configured to, when the reception notification message has been received from the communication apparatus, identify the information processing apparatus that is in cooperation with the communication apparatus that is a transmission source of the received reception notification message, and transmit the reception notification message to the identified information processing apparatus, and the first operation control unit in the information processing apparatus is configured to receive an approval operation for approval of reception or a denial operation for denial of reception, when the reception notification message has been received.

2. The communication system according to claim 1, wherein the information processing apparatus further comprises:

a first display control unit configured to start displaying a transmitting dialog when the first operation control unit has received the transmission operation for the connection request, and the communication device further comprises:

a second display control unit configured to start displaying a transmitting dialog when the transmission request message has been received.

3. The communication system according to claim 1, wherein the communication apparatus further comprises:

a second operation control unit configured to receive the transmission operation for the connection request to the partner apparatus, and the call control unit in the communication apparatus is configured to transmit, to the management apparatus, the connection request to the partner apparatus, when the second operation control unit has received the transmission operation.

4. The communication system according to claim 3, wherein the second message processing unit in the communication apparatus is configured to transmit a transmission notification message to the management apparatus, when the connection request has been transmitted, the message intermediary unit in the management apparatus is configured to, when the transmission notification message has been received, identify the information processing apparatus that is in cooperation with the communication apparatus that is a transmission source of the received transmission notification message, and transmit the transmission notification message to the identified information processing apparatus, the first message processing unit in the information processing apparatus is configured to receive the transmission notification message, the information processing apparatus further comprises a first display control unit configured to start displaying a transmitting dialog when the transmission notification message has been received, and the communication apparatus is configured to start displaying a transmitting dialog, when the second operation control unit has received the transmission operation for the connection request.

5. The communication system according to claim 1, wherein the first message processing unit in the information processing apparatus is configured to transmit an approval request message to the management apparatus, when the first operation control unit has received the approval operation, the message intermediary unit in the management apparatus is configured to, when the approval request message has been received from the information processing apparatus, identify the communication apparatus that is in cooperation with the information processing apparatus that is a transmission source of the received approval request message, and transmit the approval request message to the identified communication apparatus, the second message processing unit in the communication apparatus is configured to receive the approval request message from the management apparatus, the call control unit in the communication apparatus is configured to transmit, to the management apparatus, the approval response to the connection request, when the approval request message has been received, the call intermediary unit in the management apparatus is configured to transmit the approval response to the partner apparatus that is a transmission source of the connection request, when the approval response to the transmitted connection request has been received from the communication apparatus, and the connection formation unit in the communication apparatus is configured to establish a communication path to the partner apparatus, when the approval response has been transmitted.

6. The communication system according to claim 5, wherein
 the communication apparatus further comprises a second operation control unit configured to receive the approval operation for approval of reception or denial operation for denial of reception, when the connection request has been received, and
 the call control unit in the communication apparatus is configured to transmit the approval response to the management apparatus, when the second operation control unit has received the approval operation.

7. The communication system according to claim 1, wherein
 the information processing apparatus further comprises an in-processing-apparatus call control unit configured to transmit, to the management apparatus, the approval response to the connection request, when the first operation control unit has received the approval operation,
 the call intermediary unit in the management apparatus is configured to, when the approval response to the transmitted connection request has been received from the information processing apparatus, transmit the received approval response to the partner apparatus that is the transmission source of the connection request,
 the first message processing unit in the information processing apparatus is configured to transmit an approval notification message to the management apparatus, when the approval response has been transmitted,
 the message intermediary unit in the management apparatus is configured to, when the approval notification message has been received from the information processing apparatus, identify the communication apparatus that is in cooperation with the information processing apparatus that is a transmission source of the approval notification message, and transmit the approval notification message to the identified communication apparatus,
 the second message processing unit in the communication apparatus is configured to receive the approval notification message from the management apparatus, and
 the connection formation unit in the communication apparatus is configured to establish a communication path to the partner apparatus, when the approval notification message has been received.

8. The communication system according to claim 1, wherein
 the information processing apparatus further comprises a first display control unit configured to start displaying a receiving dialog when the reception notification message has been received, and
 the communication apparatus further comprises a second display control unit configured to start displaying a receiving dialog when the connection request has been received from the partner apparatus.

9. An information processing apparatus comprised in the communication system according to claim 1.

10. A non-transitory computer-readable medium including programmed instructions that cause a computer to function as the information processing apparatus according to claim 9.

11. A communication apparatus comprised in the communication system according to claim 1.

12. A non-transitory computer-readable medium including programmed instructions that cause a computer to function as the communication apparatus according to claim 11.

* * * * *